(12) United States Patent
Kito et al.

(10) Patent No.: US 10,514,851 B2
(45) Date of Patent: Dec. 24, 2019

(54) STORAGE APPARATUS AND RECORDING MEDIUM

(71) Applicant: Hitachi, Ltd., Chiyoda-ku, Tokyo (JP)

(72) Inventors: Takahiro Kito, Tokyo (JP); Ran Ogata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 15/759,166

(22) PCT Filed: Jan. 5, 2016

(86) PCT No.: PCT/JP2016/050129
§ 371 (c)(1),
(2) Date: Mar. 9, 2018

(87) PCT Pub. No.: WO2017/119065
PCT Pub. Date: Jul. 13, 2017

(65) Prior Publication Data
US 2018/0285000 A1    Oct. 4, 2018

(51) Int. Cl.
*G06F 3/06* (2006.01)
*G06F 12/0873* (2016.01)
*G06F 11/14* (2006.01)

(52) U.S. Cl.
CPC ............ *G06F 3/0619* (2013.01); *G06F 3/065* (2013.01); *G06F 3/0611* (2013.01); *G06F 3/0665* (2013.01); *G06F 3/0689* (2013.01); *G06F 12/0873* (2013.01); *G06F 3/0631* (2013.01); *G06F 11/1466* (2013.01); *G06F 2201/84* (2013.01)

(58) Field of Classification Search
CPC ...... G06F 3/0665; G06F 3/065; G06F 3/0689; G06F 2201/84
See application file for complete search history.

(56) References Cited

U.S. PATENT DOCUMENTS

| | | | |
|---|---|---|---|
| 2007/0150677 A1* | 6/2007 | Homma | G06F 11/2082 711/162 |
| 2012/0311261 A1 | 12/2012 | Mizuno et al. | |
| 2013/0219138 A1* | 8/2013 | Nasu | G06F 3/0608 711/162 |
| 2017/0032005 A1* | 2/2017 | Zheng | G06F 16/128 |

FOREIGN PATENT DOCUMENTS

JP    2014-507693 A    3/2014

* cited by examiner

*Primary Examiner* — Edward J Dudek, Jr.
(74) *Attorney, Agent, or Firm* — Procopio, Cory, Hargreaves & Savitch LLP

(57) ABSTRACT

Generating a snapshot of a volume storing a snapshot and Suppressing response time. When receiving from a host computer write data to be written into a target slot in a target volume among multiple volumes, a processor adds to management information a fact that data in the target slot in the target volume has not been finalized, writes the write data into a target cache area in a memory, and transmits a response to the host computer. Before referring to the target data in the target slot of the target volume, the processor determines whether or not the target data has been finalized on the basis of the management information. When the target data is determined as not having been finalized, the processor performs a finalization process for finalizing the target data and refers the target data.

14 Claims, 35 Drawing Sheets

Fig.10

| 350 → JOB management table (CAW elimination JOB) | |
|---|---|
| 351 — Request copy type | CAW elimination |
| 352 — Request source process type | Read |
| 353 — Root LDEV# | 0x0001 |
| 354 — SSID | A |
| 355 — SLOT# | 0x01 |

Fig.21

| 410 Copy list | | | | | | |
|---|---|---|---|---|---|---|
| 421 Subscript | 1 | 2 | 3 | 4 | 5 |
| 422 CAW elimination target SSID | D | C | B | A | Invalid |
| 423 Copy source data information | Old | Current | Old | Old | Current |
| 424 Old data saving necessity | Unnecessary | Necessary | Unnecessary | Necessary | Necessary |
| 425 Old data save destination SSID | --- | D | --- | B | A |
| 426 Merging and copying necessity | Necessary | Necessary | Necessary | Necessary | Unnecessary |
| 427 Copy state | Not yet | Not yet | Middle | Middle | Middle |
| 411 Leading attribute | Root | | | | |
| 412 Leading SSID | Invalid | | | | |
| 413 List length | 5 | | | | |

STORAGE APPARATUS AND RECORDING MEDIUM

TECHNICAL FIELD

The present invention relates to a storage apparatus.

BACKGROUND ART

PTL 1 describes a technique that generates a snapshot image of a primary volume in a secondary volume in a storage apparatus and uses CAW (copy after write) during updating the primary volume.

CITATION LIST

Patent Literature

[PTL 1] National Publication of International Patent Application No. 2014-507693

SUMMARY OF INVENTION

Technical Problem

According to the snapshot technique as described above, in the case that the primary volume is updated after generation of the snapshot, difference data due to the update is written into the secondary volume after the update. Consequently, it is difficult to generate a snapshot of the secondary volume further.

Solution to Problem

To solve the above problem, a storage apparatus that is an aspect of the present invention includes: a storage device; a memory; and a processor coupled to the storage device, the memory, and a host computer. The processor is configured to generate a pool for using the storage device, the processor is configured to generate a plurality of volumes, each volume includes a plurality of slots, the plurality of volumes include a root volume and a plurality of virtual volumes, and each virtual volume stores a snapshot of another parent volume among the plurality of volumes at a designated time point, the processor is configured to associate the plurality of slots in each virtual volume with a plurality of slots in the corresponding parent volume, the processor is configured to associate the slot for storing data in each virtual volume with a pool area in the pool, the processor is configured to write, into the pool, difference data between the parent volume and the corresponding virtual volume, the processor is configured to record, into the memory, management information that indicates a relationship between the plurality of volumes and the pool, the processor is configured to, in the case of receiving, from the host computer, write data to be written into a target slot in a target volume among the plurality of volumes, record a fact indicating that data in the target slot in the target volume has not been finalized, to the management information, write the write data into a target cache area in the memory, and transmit a response to the host computer, the processor is configured to, before referring to the target data in the target slot of the target volume, determine whether or not the target data has been finalized on the basis of the management information, the processor is configured to, in case that the target data is determined as not having been finalized, perform a finalization process for finalizing the target data, and refers the target data. The finalization process selects a copy source volume for storing data in the target slot in the target volume based on the management information, and determines whether a copy source data in the target slot in the copy source volume is finalized or not based on the management information, when it is determined that the copy source data is to be finalized, the finalization process performs a saving process for saving the target data, performs a merge process for updating the target data, and records a fact that the target data is to be finalized into the management information, the saving process determines whether the target data is required to be saved or not based on the management information, when it is determined that the target data is required to be saved, the saving process writes the target data into the pool, and the merge process generates merged data by merging the copy source data with the write data, and writes the merged data into the pool.

Advantageous Effects of Invention

A snapshot of a volume storing a snapshot can be generated, while the response time can be suppressed.

BRIEF DESCRIPTION OF DRAWINGS

FIG. 10 shows a third part of the management information 111.
FIG. 21 shows a copy list 410.

DESCRIPTION OF EMBODIMENTS

Figure 1:
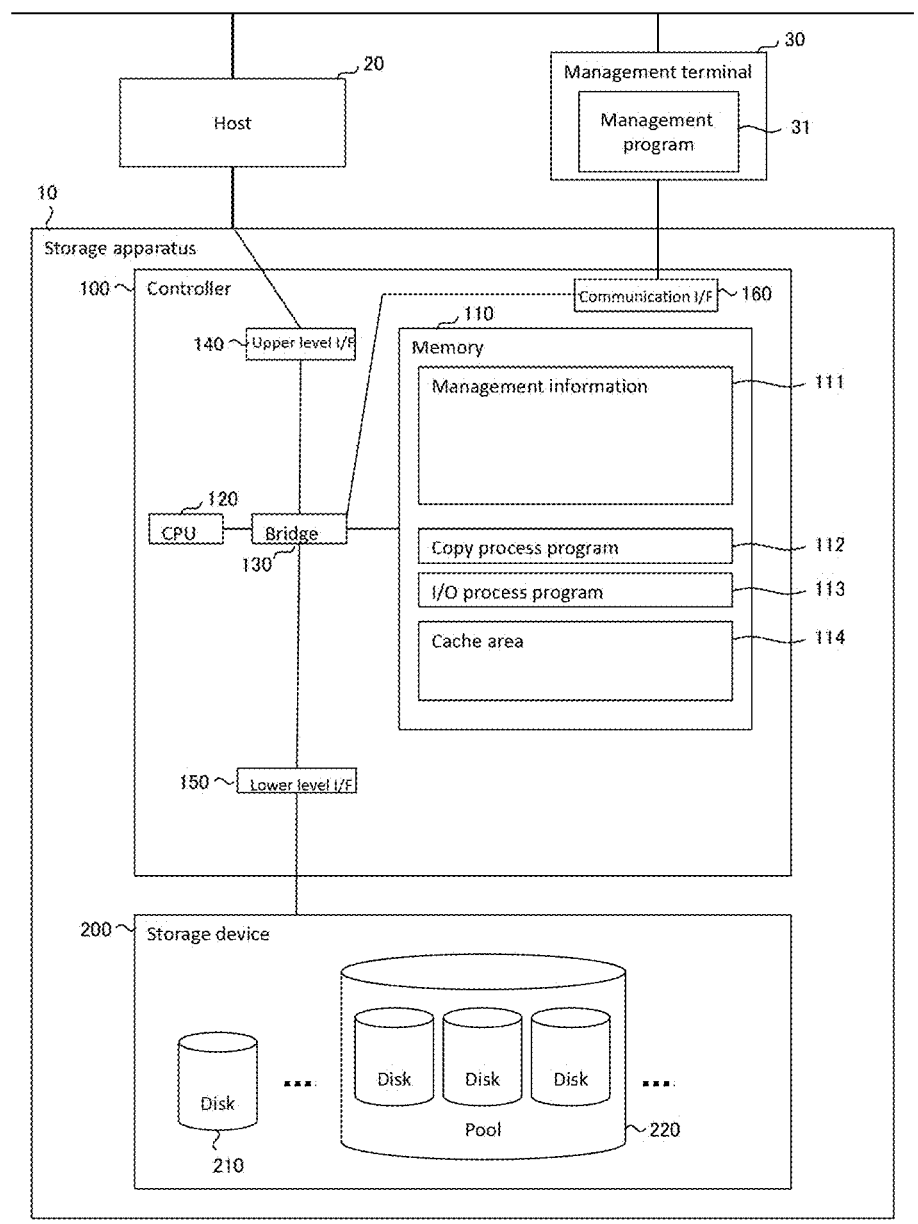
FIG. 1 shows a configuration of a computer system.

Hereinafter, referring to the drawings, embodiments of the present invention are described.

In the following description, although information is sometimes described with a representation "xxx table", the information may be represented with any data structure. That is, to indicate that the information does not depend on the data structure, "xxx table" can be called "xxx information". Furthermore, in the following description, the structure of each table is an example. One table may be divided into two or more tables. All or some of two or more tables may be one table.

In the following description, an ID is used as identification information on an element. Instead of or in addition to the ID, other type of identification information may be used.

In the following description, in a case where the same type of elements are sometimes described without discrimination, a reference sign or a common numeral among reference signs are used. In a case where the same types of elements are described with discrimination, the reference signs of the elements are sometimes used or, instead of the reference signs, IDs assigned to the elements are sometimes used.

In the following description, an I/O (Input/Output) request is a write request or a read request, and may be called an access request.

In the following description, a process is sometimes described with "program" being adopted as a subject of a sentence. Alternatively, the subject of a sentence of a process may be a processor (e.g., CPU (Central Processing Unit)), because the program is executed by the processor to thereby perform a predetermined process while appropriately using storing resources (e.g., memory) and/or an interface device (e.g., a communication port). The process described with the program being adopted as the subject of a sentence may be regarded as a process executed by a processor or an apparatus that includes the processor, or be a system. The processor may include a hardware circuit that performs some or all processes. The program may be installed from a program source into an apparatus, such as a computer. The program source may be, for example, a program distribution server, or a computer-readable storing medium. In a case where the program source is a program distribution server, the program distribution server may include a processor (e.g., CPU) and a storing resource, and the storing resource may store a distribution program and a program that is a distribution target. The processor of the program distribution server executes the distribution program, which may allow the processor of the program distribution server to distribute the distribution target program to another computer. In the following description, two or more programs may be realized as one program, and one program may be realized as two or more programs.

In the following description, a management system may include one or more computers. More specifically, for example, in a case where a management computer displays information (more specifically, for example, a case where the management computer displays the information on its own display device, or a case where the management computer transmits the information to be displayed to a remote display computer), the management computer is the management system. For example, in a case where multiple computers realize a function equivalent to the management computer, the multiple computers (which may include the display computer in a case where display is performed by the display computer) are the management system. The management computer (e.g., the management system) may include: an interface device coupled to an I/O system including a display system; a storing resource (e.g., a memory); and a processor coupled to the interface device and the storing resource. The display system may be a display device included in the management computer, or a display computer coupled to the management computer. The I/O system may be an I/O device (e.g., a keyboard and a pointing device and a touch panel) included in the management computer, or the display computer or another computer which is coupled to the management computer. The management computer's "displaying of the information to be displayed" is displaying of the information to be displayed on the display device. This may be displaying of the information to be displayed on the display device included in the management computer, or the management computer's transmitting of the information to be displayed to the display computer (in the latter case, the information to be displayed is displayed by the display computer). The management computer's input and output of information may be input and output of the information with the I/O device included in the management computer, or input and output of the information with a remote computer (e.g., the display computer) coupled to the management computer. Output of information may be information displaying.

Example 1

FIG. 1 shows the configuration of a computer system.

The computer system includes a storage apparatus 10, a host computer 20, and a management terminal 30. The management terminal 30 may be coupled to the host computer 20 via a communication network.

The host computer 20 transmits a WR (write) request to the storage apparatus 10, thereby writing data into the storage apparatus 10. The host computer 20 transmits an RD (Read) request to the storage apparatus 10, thereby reading data from the storage apparatus 10.

The management terminal 30 includes a memory, a CPU, a communication I/F, an input device, and a display device. In the management terminal 30, the CPU performs a process by executing a management program 31 stored in the memory. For example, the management terminal 30 accepts configuration information on the storage apparatus 10 which is to be input from an administrator into the input device, and transmits the configuration information to the storage apparatus 10. The management terminal 30 receives state information on the storage apparatus 10 from the storage apparatus 10, and displays the state information to the display device.

The storage apparatus 10 includes a controller 100, and a storage device 200. The storage device 200 includes multiple disks 210.

The controller 100 includes a memory 110, a CPU 120, a bridge 130, an upper level I/F 140, a lower level I/F 150, and a communication I/F 160.

The CPU 120 performs processes according to a program in the memory 110. For example, the CPU 120 generates a pool 220 using the disk 210. The bridge 130 couples the parts of the controller 100 to each other. The upper level I/F 140 is coupled to the host computer 20 via the communication network. The lower level I/F 150 is coupled to the disk 210. The communication I/F 160 is coupled to the management terminal 30 via the communication network.

The memory 110 stores management information 111, a copy process program 112, an I/O process program 113, and a cache area 114.

The management information 111 is information for managing data stored in the disk 210. The copy process program 112 copies data between the multiple disks 210. The I/O process program 113 performs an I/O process in response to a request from the host computer 20. The cache area 114 temporarily stores data transmitted and received to and from the host computer 20 by the I/O process.

Figure 2:
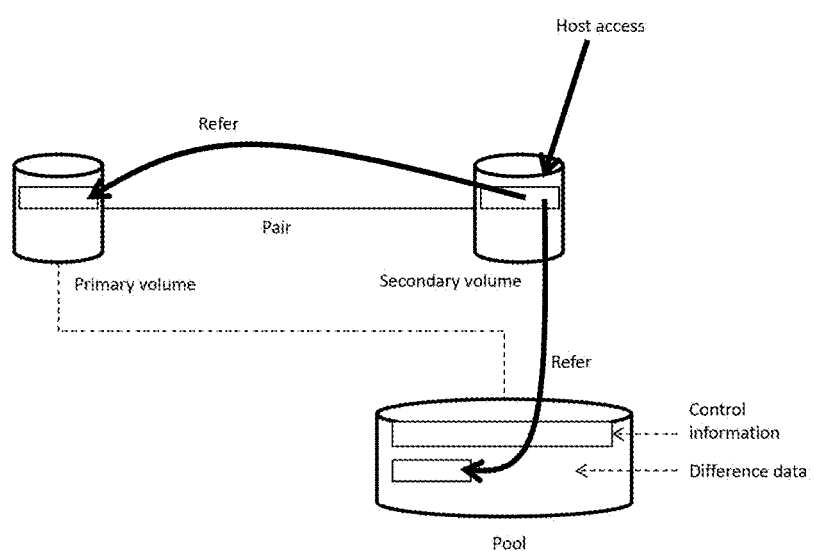
FIG. 2 shows an overview of a snapshot.

FIG. 2 shows an overview of a snapshot.

The I/O process program 113 generates logical volumes or virtual volumes using the disk 210. The I/O process program 113 generates the logical volumes which serve as the pool, and allocates storage areas to the virtual volumes in the pool through thin provisioning. The copy process program 112 configures the primary volume and the secondary volume as a pair. This configuration allows the storage apparatus 10 to generate instantaneously a copy of the primary volume in the secondary volume. Subsequently, the primary volume is sometimes called a P-VOL (primary volume), and the secondary volume is sometimes called an S-VOL (secondary volume).

When write into a certain area in the primary volume is performed, the copy process program 112 writes, into the pool, difference data between the primary volume and the secondary volume due to the write, and records entity position information that indicates the entity position of the difference data in the pool. Subsequently, before the area in the secondary volume is referred to, the I/O process program 113 searches for the entity position, and refers to the difference data on the entity position in the pool on the basis of the entity position information. The copy process program 112 stores, in the pool, SS (Snapshot) control information that includes the entity position information. The entity position of the data indicates the pool address allocated to the volume in the case of the virtual volume, and indicates the logical address in the volume in the case of the logical volume.

In this Embodiment, a unit storage area in each of the volume, pool, and cache area is called a slot. The slot is managed by an identifier, such as a slot number. The slot in the secondary volume is associated with the slot having the identical slot number in the primary volume corresponding to the secondary volume. The size of the slot is, for example, 256 kB. In particular, the slot in the pool is called a pool slot, and the slot in the cache area is called a cache slot. Instead of the slot, another storage area that indicates the address range may be used.

In this Embodiment, when the primary volume is updated, the copy process program 112 writes data (old data) having not been updated, as the difference data, into the pool. The pool slot that stores the difference data in the pool is allocated to the slot in the secondary volume. One pool slot may be allocated to the slots having the identical slot number in multiple secondary volumes. Note that the difference data may be updated latest data (current data). In this case, the pool slot that stores the difference data in the pool may be allocated to the slot in the primary volume.

Figure 3:
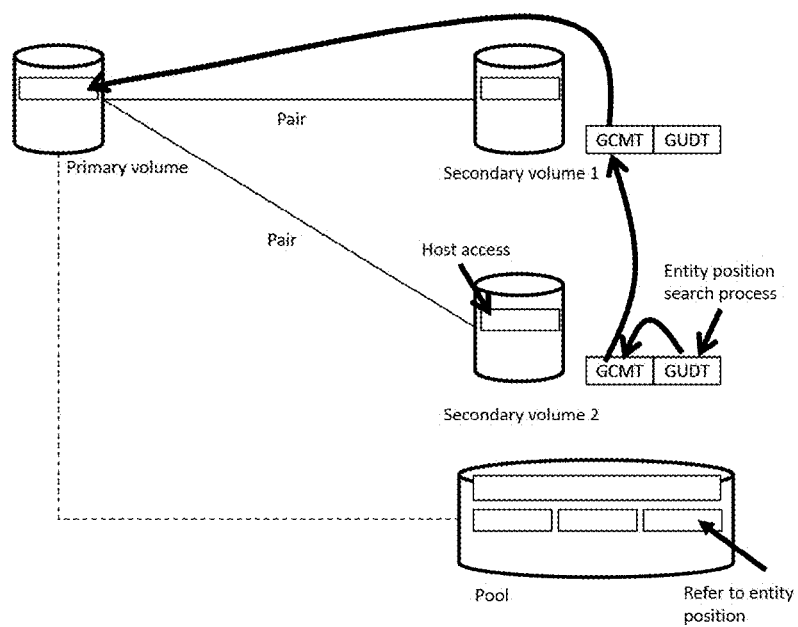
FIG. 3 shows an overview of SS control information and an entity position search process.

FIG. 3 shows an overview of the SS control information and an entity position search process.

The SS control information on the volume includes inter-generational common information (GCMT) and generation unique information (GUDT) on a slot-by-slot basis. The GCMT is valid, in a case where the difference data, such as difference data saved from another volume, is shared between generations. The valid GCMT includes a pointer (entity position information) that indicates the pool slot at the entity position of the difference data. The GUDT is valid, in a case where difference data specific to the volume is stored, such as a case where the volume is updated and is not required to be saved. The valid GUDT includes a pointer that indicates the pool slot at the entity position of the difference data. The pointers in the GCMT and GUDT include pool numbers and pool slot numbers. Instead of the pool slot number, an address in the pool may be used.

For example, in a case where write is performed into the slot in the primary volume and the difference data on the slot in the primary volume is to be saved into the secondary volume, the copy process program 112 saves the difference data into the pool, and stores the entity position information on the save destination into the GCMT of the slot in the secondary volume. For example, in a case where write is performed into the secondary volume and difference data occurs in the slot in the secondary volume, the copy process program 112 writes the difference data into the pool, and stores the entity position information that indicates the write destination into the GUDT in the slot in the secondary volume.

Here, a secondary volume 2 is generated as a snapshot of the primary volume. Subsequently, a secondary volume 1 is generated as a next-generation snapshot of the primary volume. Accordingly, the latest data is stored in the primary volume, and newer-generation data than that of the secondary volume 2 is stored in the secondary volume 1. In the primary volume, the secondary volume 1 and the secondary volume 2, a slot indicated by the slot number of the host-accessed slot is called a target slot.

The copy process program 112 performs an entity position search process of searching for the entity position, when the secondary volume is referred to. In the entity position search process, the copy process program 112 configures the secondary volume 2 to be accessed, as the search volume, and determines whether the GUDT of the target slot in the search volume is valid or not. If the GUDT is valid, the copy process program 112 returns the entity position information included in the GUDT. If the GUDT is invalid, the copy process program 112 determines whether the GCMT of the target slot is valid or not. If the GCMT is valid, the copy process program 112 returns the entity position information included in the GCMT. If the GCMT is invalid, the copy process program 112 determines whether the GCMT of the target slot in a newer-generation search volume than the search volume concerned is valid or not. Here, the copy process program 112 selects, as the search volume, the immediately-later-generation secondary volume among the secondary volumes belonging to the identical primary volume. If there is no such a secondary volume, the copy process program 112 selects the primary volume as the search volume. If the corresponding GCMT in the new search volume is valid, the copy process program 112 returns the entity position information included in the GCMT. If the GCMT is invalid, the copy process program 112 selects the next search volume, and continues searching until the entity position is obtained.

Figure 4:
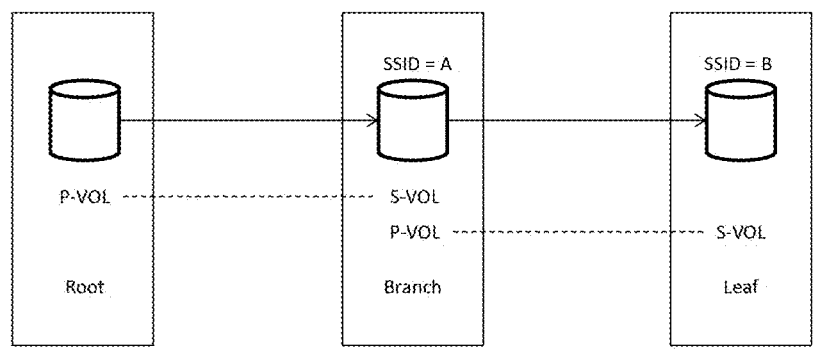
FIG. 4 shows an overview of a cascade type snapshot.

FIG. 4 shows an overview of a cascade type snapshot.

The copy process program 112 can generate another pair whose primary volume is the secondary volume of a certain pair. Accordingly, the copy process program 112 couples the pairs of snapshots in cascade, which can thus generate a cascade type snapshot structure. In the snapshot structure, the copy process program 112 assigns P-VOL (primary volume) attribute to a volume that is of a pair having an SSID (Snapshot ID) of "A" and has the S-VOL (secondary volume) attribute, generates a pair with another secondary volume, and assigns "B" as an SSID to this pair. The most leading primary volume in the snapshot structure is called the Root. A volume having the P-VOL attribute and the S-VOL attribute is called a Branch. A volume only having the S-VOL attribute is called a Leaf. Here, only the root is a logical volume (logical device: LDEV) that has an entity. The Branches and Leaves are virtual volumes. Data in the virtual volume is stored in the pool. The volumes of the Branches and Leaves can be identified on the basis of the combination of the LDEV number and the SSID of the Root. Alternatively, the Root may be a virtual volume.

Figure 5:
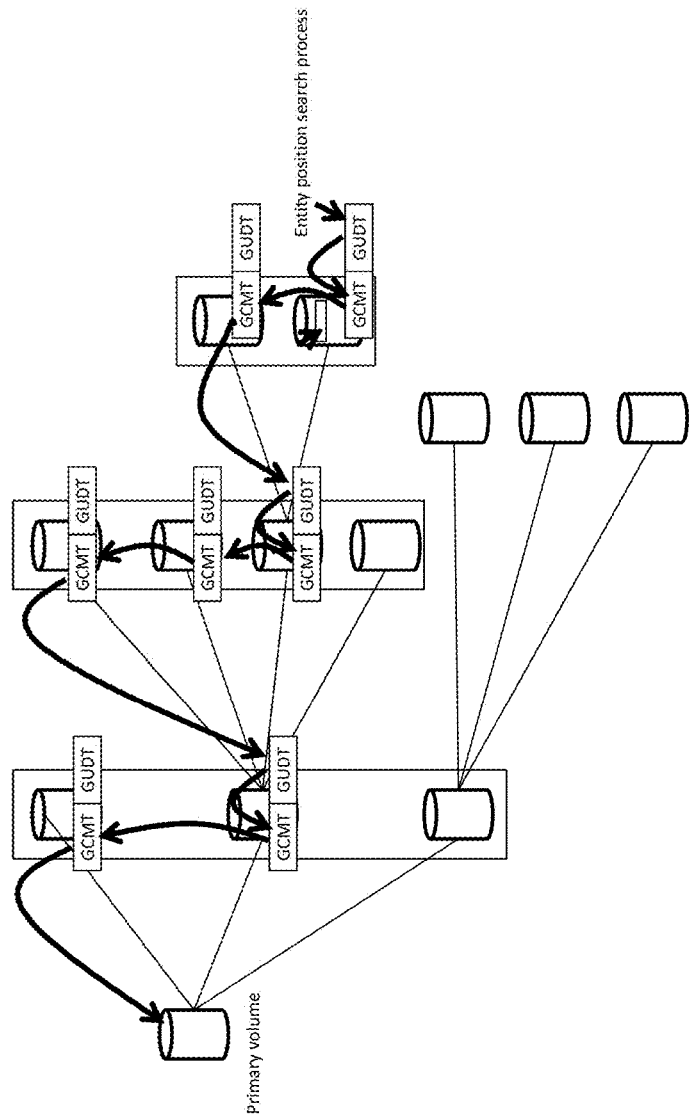
FIG. 5 shows an overview of a snapshot structure.

FIG. 5 shows an overview of the snapshot structure.

The copy process program 112 generates multiple pairs for one primary volume, and thus generates lower pairs where the secondary volumes are adopted as the primary volumes, thereby allowing tree-structured snapshot structure.

Subsequently, one volume in the snapshot structure is adopted as the target volume. In a case where the target volume is the secondary volume, the primary volume that forms a pair with the target volume is called a parent generation. In a case where the target volume is the primary volume, the secondary volume that forms a pair with the target volume is called a child generation. In a case where the target volume is one of the multiple secondary volumes having the identical primary volume, secondary volumes of an older generation than the target volume among the multiple secondary volumes are called those of an elder brother generation, and secondary volumes of a newer generation than the target volume are called those of a younger brother generation. Volumes of newer generations (younger brother generation and parent generation) than the target volume are called higher level volumes.

Current data stored in a certain slot in a certain secondary volume resides in this volume or a higher level volume of this volume. The entity position of the current data is indicated in the GUDT of this volume, is indicated in the GCMT of this volume or is indicated in the higher level volume, or is the higher level volume (Root).

According to such a snapshot structure, for example, the administrator of VDI (virtual desktop infrastructure) can instantaneously generate multiple copies of a golden image of a virtual machine, and distribute the copies. Furthermore, the administrator can update copies for divisions or sections or users, and distribute the updated copies.

COW (copy on write) is known as a method of updating the snapshot. According to COW, the old data is saved in the secondary volume, and subsequently a response is issued to the host computer. Consequently, the response time is long. For example, in VDI, in a case where the performance of the virtual machine is secured, use of COW for image copying makes the response time long. Accordingly, the copy process program 112 of this Embodiment uses CAW as the update method.

Figure 6:
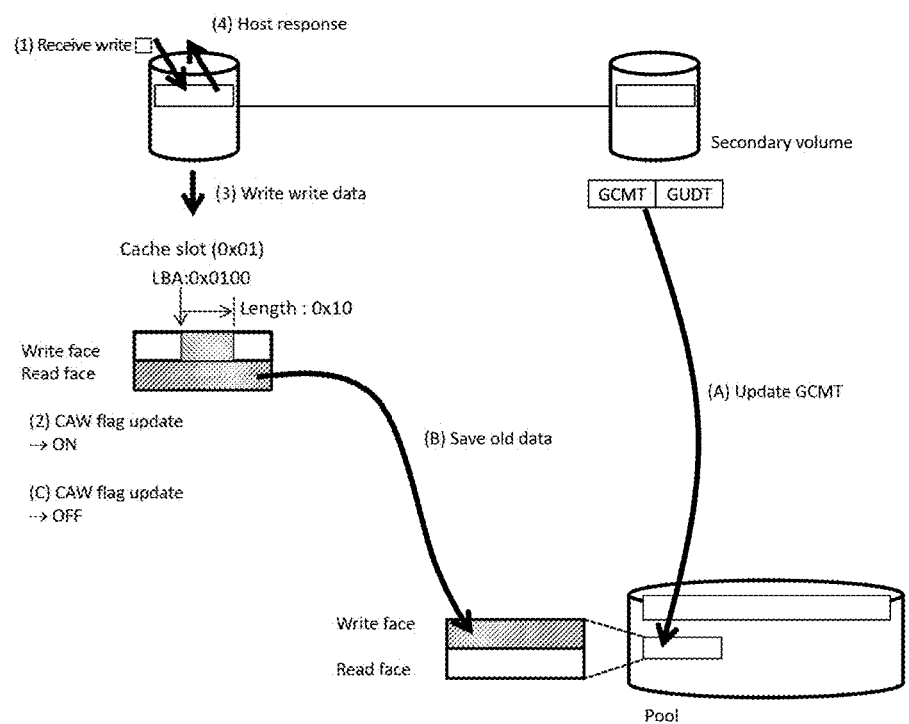
FIG. 6 shows an overview of CAW.

FIG. 6 shows an overview of CAW.

In this Embodiment, the cache area is managed with respect to each cache slot. One cache slot includes a W face (write face) on which data received from the host computer 20 is written, and an R face (read face) on which data staged from the storage device 200 is stored. Each of the sizes of the W face and the R face is the slot size.

When the storage apparatus 10 receives a WR request from the host computer 20, the controller 100 performs a WR process as described below.

(1) Upon receipt of the WR request designating an address range in the primary volume from the host computer 20, the I/O process program 113 identifies the target slot corresponding to the address range.

(2) The copy process program 112 configures a CAW flag of the target slot of the primary volume as ON.

(3) The copy process program 112 receives WR data from the host computer 20, writes the WR data into an area that is in the cache area and corresponds to the address range designated by the WR request on the W face of the target cache slot corresponding to the target slot of the primary volume.

(4) The I/O process program 113 transmits, to the host computer 20, a response to the WR request.

A state where the CAW flag of the target slot of the primary volume is ON is a state where current data in the entire target slot of the primary volume is not finalized. This state is called the CAW state. Subsequently, at an occasion of referring to the target slot of the primary volume, the copy process program 112 performs a CAW elimination process as described below, thereby eliminating the CAW state of the target slot of the primary volume.

In response to (3), the I/O process program 113 changes the state of the target cache slot to "dirty", for subsequent destaging.

(A) The copy process program 112 stores the pointer of the save destination pool slot of the pool, in the GCMT of the target slot of the secondary volume.

(B) The copy process program 112 performs an old data save (save copy) process that copies the old data stored on the R face of the target cache slot onto the W face of the cache slot corresponding to the target slot of the secondary volume. Subsequently, the I/O process program 113 writes the old data from the W face into the pool slot through destaging. In the old data saving process, in a case where no cache slot is allocated to the target slot of the primary volume, the copy process program 112 allocates the target cache slot to the target slot of the primary volume, and stages the old data onto the R face of the target cache slot.

(C) The copy process program 112 configures the CAW flag of the target slot of the primary volume as OFF.

In response to (B), the I/O process program 113 changes the state of the target cache slot to "clean", after target cache slot destaging.

As described above, the CAW issues a response to the host computer 20 before the old data saving process. Consequently, the CAW can reduce the response time to the WR request in comparison with the COW.

Figure 7:
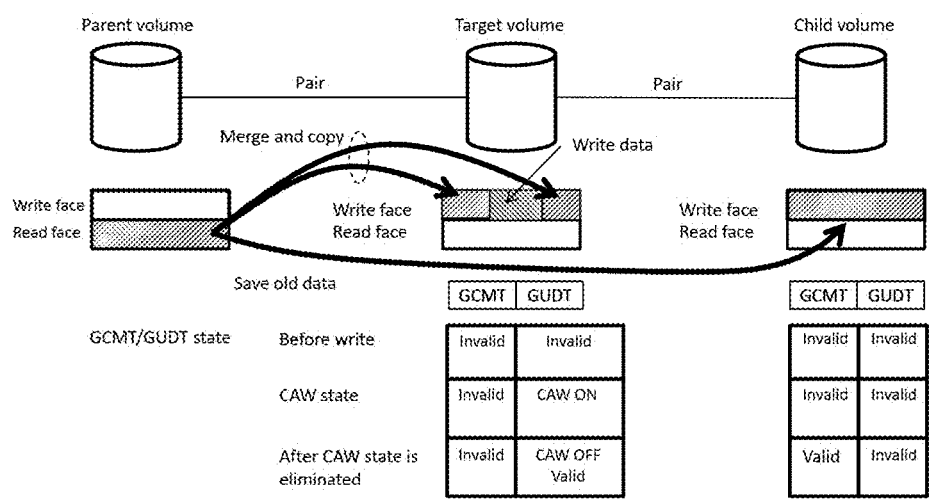
FIG. 7 shows an overview of a CAW elimination process for the cascade type snapshot.

FIG. 7 shows an overview of the CAW elimination process for the cascade type snapshot.

In response to a write request for the target slot of an update target volume that is a Branch of the cascade type snapshot, the I/O process program 113 writes the WR data onto a part of the W face corresponding to the target slot, and configures the target slot to be in the CAW state. Subsequently, at an occasion of referring to the target slot, such as access (read or write) to the target slot by the host computer 20, and target slot destaging by the controller 100, the copy process program 112 performs a CAW elimination process for eliminating the CAW state.

Here, the primary volume (parent-generation volume) of a pair whose secondary volume is the update target volume is called a parent volume. The secondary volume (child-generation volume) of a pair whose primary volume is the update target volume is called a child volume. The target slot of the parent volume, and the target slot of the child volume have the same slot number as the target slot of the update target volume.

Before write into the target slot of the update target volume, the GCMT and GUDT of the target slot and the GCMT and GUDT of the target slot of the child volume are each invalid. According to the write into the target slot of the update target, the WR data is written onto the W face of the cache slot corresponding to the target slot of the update target volume, and the CAW flag of the target slot of the update target volume is turned ON.

In the CAW elimination process, first, the copy process program 112 performs an old data save process that saves the old data in the target slot of the update target volume into the target slot of the child volume. The old data save process copies the old data that is in the target slot of the update target volume and is stored on the R face corresponding to the target slot of the parent volume, onto the W face corresponding to the target slot of the child volume, and allocates a new pool slot in the pool to the target slot of the child volume.

Subsequently, the copy process program 112 performs a merging and copying process that merges the old data and the WR data. The merging and copying process regards, as a supplementary LBA (logical block address) range, an LBA range that is on the W face corresponding to the target slot of the update target volume and is other than the area in which the WR data is written, and copies data stored in the supplementary LBA range on the R face corresponding to the target slot of the parent volume into the supplementary LBA range on the W face corresponding to the target slot of the update target volume.

Accordingly, the old data in the update target volume is saved from the parent volume into the child volume, the old data in the parent volume is merged with the WR data, thereby obtaining the current data and allowing the current data to be written into the update target volume. Consequently, the data in the target slot of the update target volume is finalized, and the CAW state of the target slot of the update target volume is eliminated.

After the CAW elimination process, the CAW flag of the target slot of the update target volume is turned OFF, and the entity position information on the GUDT of the target slot of the update target volume becomes valid. Furthermore, the entity position information on the GCMT of the target slot of the child volume becomes valid.

In the CAW elimination process, if the target slot of the parent volume is in the CAW state, the CAW elimination process for the parent volume is required.

Here, a first part to a third part of the management information 111 are described in a separated manner.

Figure 8:
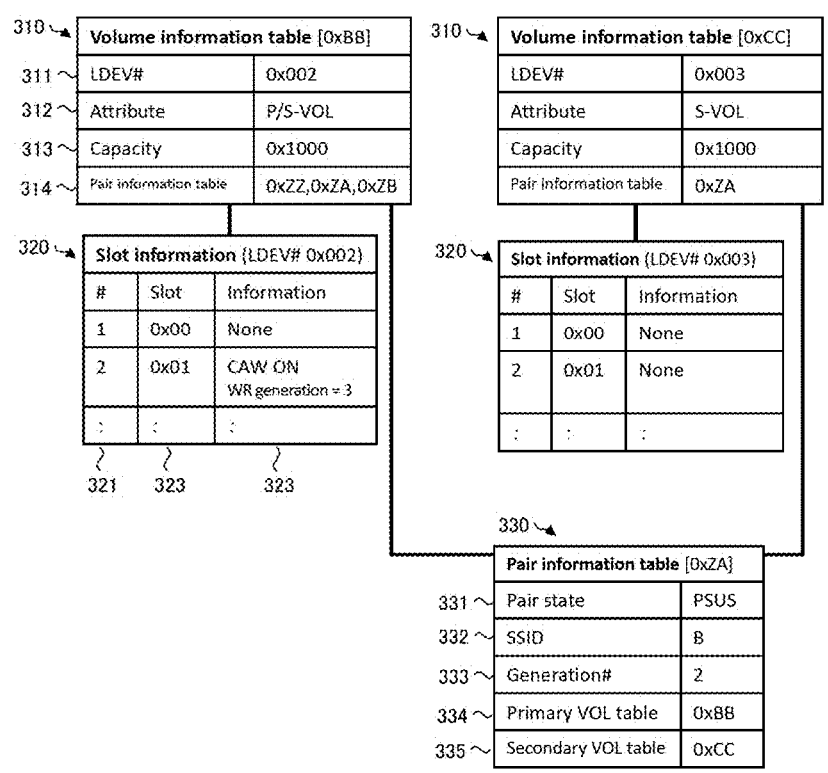
FIG. 8 shows a first part of management information 111.

FIG. 8 shows the first part of the management information 111.

The management information 111 includes a volume information table 310 generated on a volume-by-volume basis, slot information 320 generated on a volume-by-volume basis, and a pair information table 330 generated on a pair-by-pair basis.

The volume information table 310 corresponding to one volume includes an LDEV number 311, an attribute 312, a capacity 313, and a pair information table pointer 314. The LDEV number 311 is an identifier that indicates this volume. The attribute 312 indicates that this volume is any of the primary volume (P-VOL), the secondary volume (S-VOL), both the primary volume and secondary volume (P/S-VOL) and another volume. The capacity 313 indicates the capacity of this volume. The pair information table pointer indicates the pair information table 330 of the pair to which this volume belongs.

The slot information 320 corresponding to one volume includes an entry in each slot in this volume. The entry corresponding to one slot includes a slot number 321 that indicates this slot, and information 322 on this slot. The information 322 includes the CAW flag, and a WR generation number. The WR generation number indicates the order of writing to this slot with respect to the pair order.

The pair information table 330 corresponding to one pair includes a pair state 331, an SSID 332, a generation number 333, a primary volume table pointer 334, and a secondary volume table pointer 335. The pair state 331 indicates a pair state (PAIR) of allowing the difference data to be written, or a suspend state (PSUS) of not allowing the difference data to be written. The SSID 332 is an identifier that indicates this pair. The generation number 333 indicates the order of the generation of this pair. The primary volume table pointer 334 is a pointer that indicates the volume information table 310 of the primary volume in this pair. The secondary volume table pointer 335 is a pointer that indicates the volume information table 310 of the secondary volume in this pair.

The copy process program 112 provides the pair with the generation number and provides the written slot with the WR generation number so that the generation number and the WR generation number can be sequential serial numbers. For example, the copy process program 112 generates a certain pair, and then provides this pair with the generation number n. Subsequently, a certain slot of the primary volume of this pair is written, and then the copy process program 112 provides this slot with the WR generation number n+1, which is obtained by adding one to the maximum value n of the generation number. Subsequently, the copy process program 112 generates a new pair, and then provides the new pair with the generation number n+2, which is obtained by adding one to the maximum value of the generation number and the WR generation number.

Figure 9:
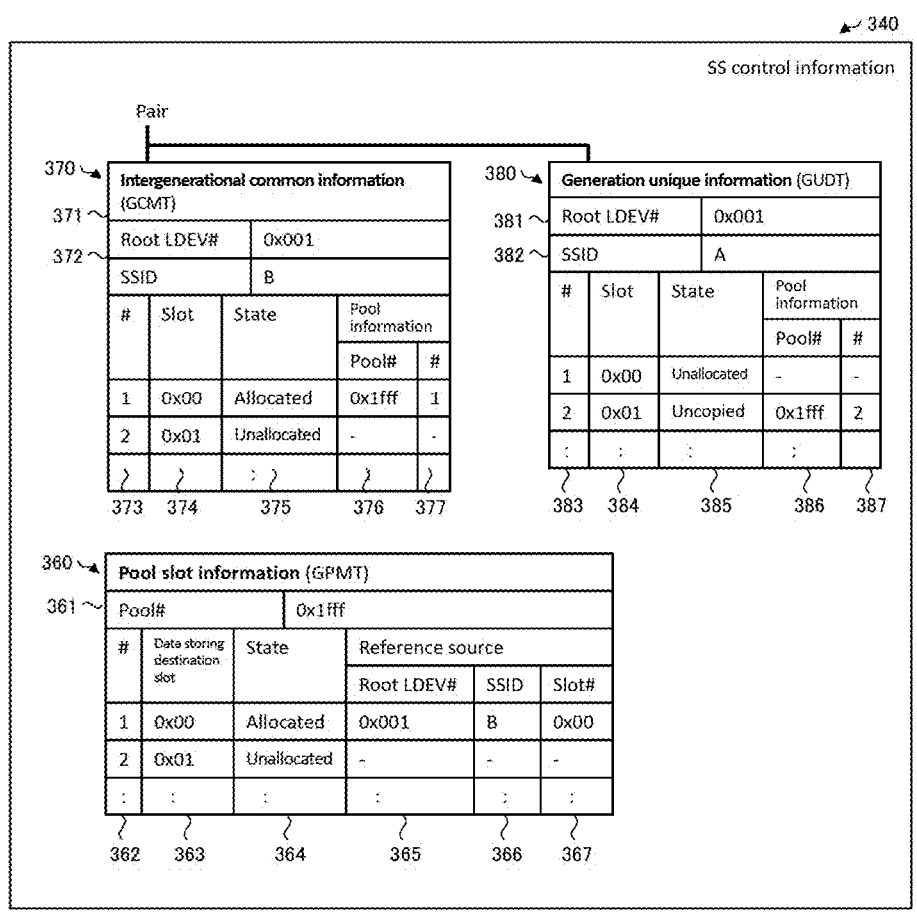
FIG. 9 shows a second part of the management information 111.

FIG. 9 shows the second part of the management information 111.

The management information 111 further includes SS control information 340. The SS control information 340 includes pool slot information (GPMT) 360 generated on a pool-by-pool basis, intergenerational common information (GCMT) 370 generated on a pair-by-pair basis, and generation-unique information (GUDT) 380 generated on a pair-by-pair basis.

The pool slot information 360 corresponding to one pool includes a pool number 361 that is an identifier indicating this pool, and an entry for each pool slot. The entry corresponding to one pool slot includes a pool entry number 362, a pool slot (data storing destination) number 363, a state 364, and reference source information indicating a slot that is a slot to which this pool slot is allocated and is a reference source slot of this pool slot. The pool entry number 362 is an identifier of this entry. The pool slot number 363 is an identifier of this pool slot. The state 364 indicates the state of this pool slot, and indicates any of states that are "Unallocated" where allocation is not made to the reference source slot, "In allocation" where allocation is made to the reference source slot and data is not stored, and "Allocated" where allocation is made to the reference source slot and the data is stored. The reference source information includes a Root LDEV number 365, an SSID 366, and a slot number 367. The combination of the Root LDEV number 365 and the SSID 366 indicates this reference source pair. The slot number 367 indicates this reference source slot.

The GCMT 370 corresponding to one pair includes a Root LDEV number 371, an SSID 372, and an entry for each slot of the secondary volume of this pair. The combination of the Root LDEV number 371 and the SSID 372 indicates this pair. The entry corresponding to one slot includes a slot entry number 373, a slot number 374, a state 375, and pool information indicating the pool slot that is a pool slot allocated to this slot and is the reference source pool slot of this slot. The slot entry number 373 is an identifier of this entry. The slot number 374 is an identifier of this slot. The state 375 indicates the state of this slot, and indicates any of states that are "Unallocated" where the reference destination is not allocated, "In allocation" where the reference destination is allocated and data is not stored, and "Allocated" where the reference destination is allocated and the data is stored. The pool information includes a pool number 376, and a pool entry number 377. The pool number 376 indicates the reference destination pool. The pool entry number 377 indicates the reference destination pool slot.

The GUDT 380 corresponding to one pair includes a Root LDEV number 381, an SSID 382, and an entry for each slot of the secondary volume of this pair. The entry corresponding to one slot includes a slot entry number 383, a slot number 384, a state 385, and pool information on the reference destination of the data entity to be referred to by this slot. The pool information includes a pool number 386, and a pool entry number 387. Items 381 to 384, 386, and 387 are analogous to the respective items 371 to 374, 376 and 377. The state 385 indicates the state of this slot, and indicates any of states that are "Unallocated" where the reference destination is not allocated, "Uncopied" where the reference destination is allocated and data is not stored, and "Allocated" where the reference destination is allocated and the data is stored.

FIG. 10 shows the third part of the management information 111.

The management information 111 further includes a job management table 350 which is created on a job-by-job basis.

A job management table 350 corresponding to one job includes a request copy type 351, a request source process type 352, a Root LDEV number 353, an SSID 354, and a slot number 355. The request copy type 351 indicates the type of the process of this job. The type of the process here is, for example, a CAW elimination process. The request source process type 352 indicates the type of the process (the process of the request source) that activates the job. The type of the process here is RD, WR, destaging or the like. The Root LDEV number 353 indicates the volume of Root in the snapshot structure to which the target volume of the job belongs. The SSID 354 indicates the target pair of this job. The slot number 355 indicates the target slot of this job.

To enter a job, such as a CAW elimination job or a read job, the copy process program 112 and the I/O process program 113 generate the job management table 350 corresponding to this job.

The GCMT 370 and the GUDT 380 may be stored in the pool 220.

The management information 111 may further include a cache table that indicates association between the slot and the cache slot.

The management program 31 causes the display device to display a pair configuration screen for generating a snapshot pair, and accepts an input from the administrator. Here, as shown in the diagram of the first part of the management information 111 described above, the management program 31 may display, on the pair configuration screen, the attribute 312 (P-VOL attribute, S-VOL attribute, P/S-VOL attribute, etc.) of the volume serving as the primary volume of the pair to be generated, from the volume information table 310, or may display, on the pair configuration screen, whether the attribute 312 of the volume includes the S-VOL attribute (storing a snapshot of another volume) or not. In a case where the attribute 312 of the volume includes the S-VOL attribute of another pair, the management program 31 may display, on the pair configuration screen, the primary volume that forms the pair with the volume concerned, the Root volume of the snapshot structure or the like. As shown in the diagram of the snapshot structure described above, the management program 31 may cause the display device to display the snapshot structure that indicates the relationship of the pairs of the volumes shown in the diagram of the snapshot structure described above, on the basis of the pair information table 330. Accordingly, the administrator can input an instruction of generating a pair, through selecting an appropriate primary volume.

Figure 11:
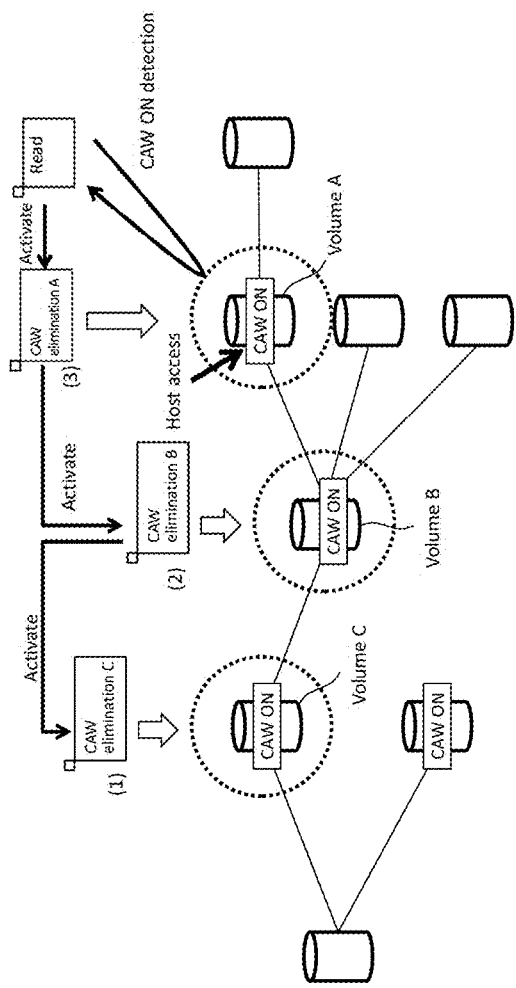
FIG. 11 shows an overview of a CAW elimination process in Embodiment 1.

FIG. 11 shows an overview of the CAW elimination process in Embodiment 1.

For example, the I/O process program 113 activates the read job in response to an RD request for a target slot of a volume A from the host computer 20. Here, slots having the slot number of the target slot, in a volume B that is a parent-generation volume of the volume A and in a volume C that is a parent-generation volume of the volume B, are called target slots. Upon detection of the target slot of the volume A being in the CAW state, the read job activates the CAW elimination job A for the target slot of the volume A, and stands by until the CAW state is eliminated. Upon detection of the target slot of the volume B being in the CAW state, the CAW elimination job A activates the CAW elimination job B for the target slot of the volume B, and stands by until the CAW state is eliminated. Upon detection of the target slot of the volume C being in the CAW state, the CAW elimination job B activates the CAW elimination job C for the target slot of the volume C, and stands by until the CAW state is eliminated.

Accordingly, the CAW elimination job C eliminates the CAW state of the target slot of the volume C that is the highest level volume among the volumes detected to be in the CAW state (1). Next, the CAW elimination job B is reactivated, and eliminates the CAW state of the target slot of the volume B (2). Next, the CAW elimination job A is reactivated, and eliminates the CAW state of the target slot of the volume A (3). Next, the read job is reactivated, reads data from the entity position in the target slot of the volume A, and issues a response to the host computer 20.

In a case where the occasion of the CAW elimination job is read, the I/O process program 113 receives a read request from the host computer 20, then analyzes a read parameter included in the read request, and identifies a target volume number, LBA, size, target slot number, etc., of the read target. Subsequently, the I/O process program 113 refers to the entry of the target slot of the slot information 320 of the target volume, and when detecting that the CAW flag is ON, activates the CAW elimination job.

In a case where the occasion of the CAW elimination job is destaging, the I/O process program 113 detects a dirty cache slot during destaging, refers to the entry having the slot number corresponding to this cache slot in the slot information 320, and when detecting that the CAW flag is ON, activates the CAW elimination job.

Figure 12:
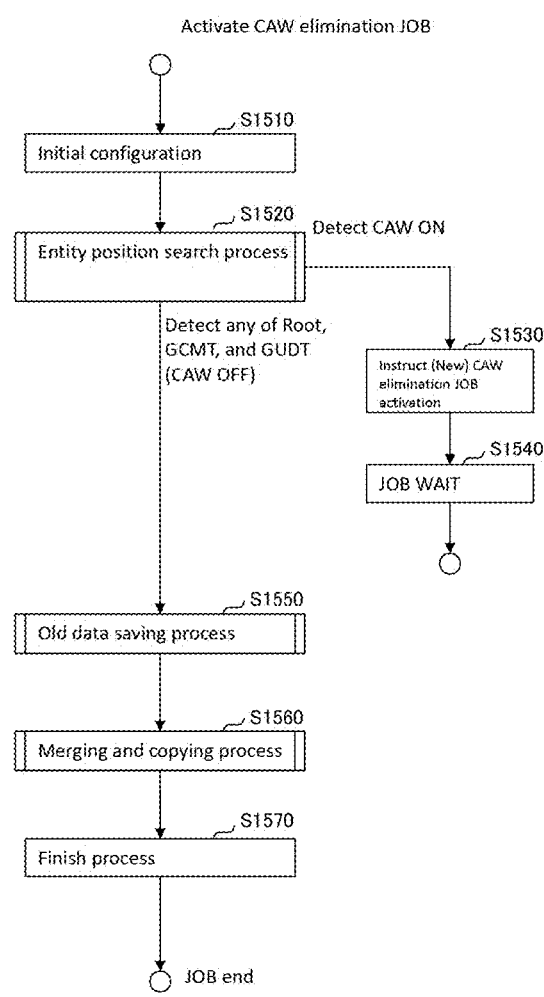
FIG. 12 shows a CAW elimination job in Embodiment 1.

FIG. 12 shows the CAW elimination job in Embodiment 1.

The job management table that indicates the target slot of the elimination target volume in the CAW state is generated, and the CAW elimination job is activated. First, in S1510, the copy process program 112 makes the initial configuration of the CAW elimination job on the basis of the job management table. Subsequently, the copy process program 112 performs the entity position search process for the target slot of the elimination target volume to thereby identify the entity position of the target slot of the elimination target volume, and determines whether the target slot of the volume corresponding to the entity position is in the CAW state or not. Here, the volume that contains the entity position information, or the volume (Root) indicated by the entity position are called an entity position volume.

If the target slot of the entity position volume is determined to be in the CAW state (S1520: CAW ON is detected), the copy process program 112 issues an instruction of activating a new CAW elimination job where the entity position volume is the elimination target volume, in S1530. Here, the copy process program 112 generates the job management table of the new CAW elimination job, and configures the SSID of the entity position volume in the job management table. Subsequently, in S1540, the copy process program 112 stands by until the activated CAW elimination job is finished. When the activated CAW elimination job is finished, the copy process program 112 is reactivated, and executes the processing again from S1510. Subsequently, in S1520, the target slot of the entity position volume is determined not to be in the CAW state.

If the target slot of the entity position volume is determined not to be in the CAW state (S1520: any of the root, GCMT, and GUDT (CAW OFF) is detected), the copy process program 112 regards the entity position volume as the copy source volume, regards the secondary volume of the elimination target volume as the save destination volume, and performs the old data save process from the target slot of the copy source volume to the target slot of the save destination volume in S1550. Here, the case where the target slot of the entity position volume is not in the CAW state is a case where any of the fact that the entity position volume is the root, the fact that the entity position is indicated by the GCMT of the entity position volume, and the fact that the entity position is indicated by the GUDT of the entity position volume and the target slot of the entity position volume is not in the CAW state, and includes the case where the CAW state of the target slot of the entity position volume is eliminated by another CAW elimination job.

Subsequently, in S1560, the copy process program 112 performs the merging and copying process from the target slot of the copy source volume to the target slot of the elimination target volume. Subsequently, in S1570, the copy process program 112 performs a finish process that eliminates the CAW state of the target slot of the elimination target volume, and finishes this flow. Here, the copy process program 112 turns OFF the CAW flag of target slot information 323 on the slot information 320 on the elimination target volume.

According to the CAW elimination job described above, even when the CAW state of the target slot of the entity position volume is detected, a new CAW elimination job for eliminating the CAW state of the target slot of the entity position volume can be activated, and finally the CAW state of the target slot of the elimination target volume can be eliminated.

The details of the aforementioned entity position search process in S1520 are described.

Figure 13:
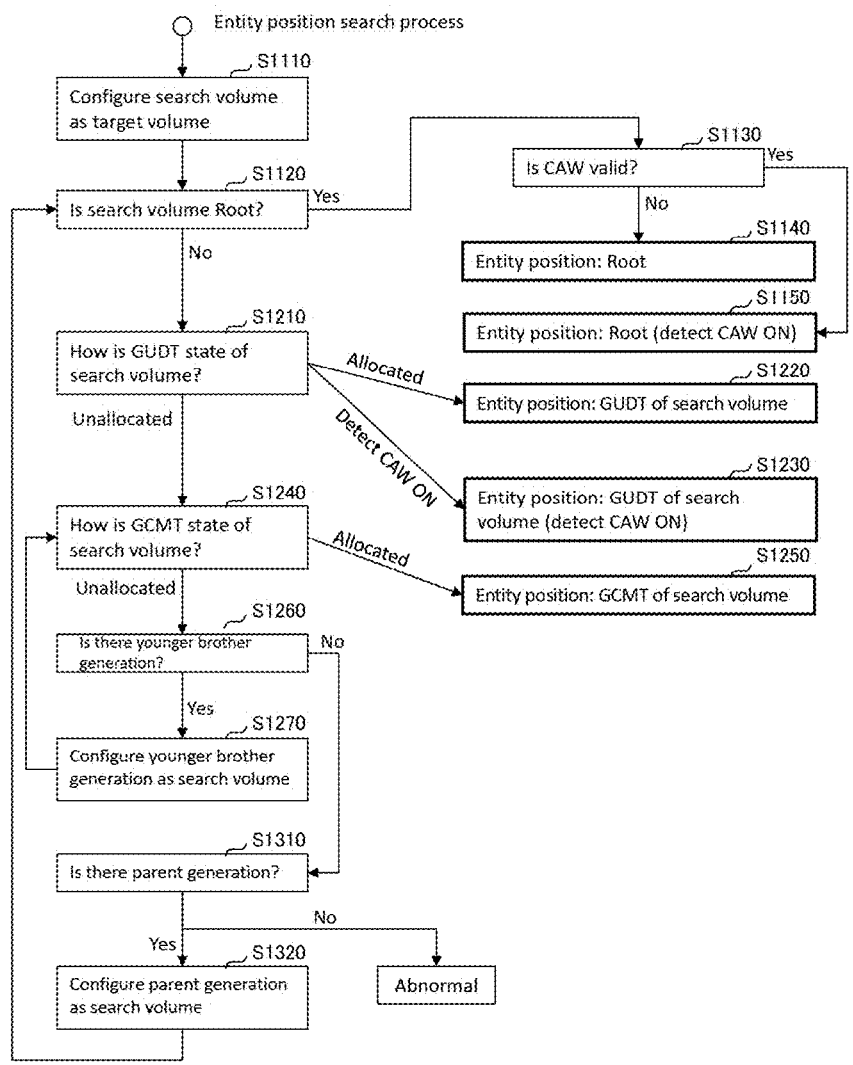
FIG. 13 shows an entity position search process.

FIG. 13 shows the entity position search process.

Here, the volume selected as the search target is called the search volume.

In S1110, the copy process program 112 selects the elimination target volume as the search volume.

Subsequently, in S1120, the copy process program 112 refers to the attribute 312 of the volume information table 310 of the search volume, and determines whether the search volume is the Root or not.

If the search volume is determined as the Root (S1120: Yes), the copy process program 112 refers to the information 323 on the target slot in the slot information 320 on the Root, and determines whether the target slot of the Root is in the CAW state or not in S1130.

If the target slot is determined not to be in the CAW state (S1130: No), the copy process program 112 issues a response that the entity position volume is the Root in S1140, and finishes this flow.

If the target slot is determined to be in the CAW state (S1130: Yes), the copy process program 112 issues a response that the entity position volume is the Root and the entity position volume is in the CAW state in S1150, and finishes this flow.

If the search volume is determined not to be the Root (S1120: No), the copy process program 112 refers to the state 385 of the target slot in the GUDT 380 in the search volume and the information 323 on the target slot in the slot information 320 on the search volume in S1210, and determines the state of the GUDT.

If the state of GUDT of the target slot is "Allocated" and the target slot is not in the CAW state (S1210: "Allocated"), the copy process program 112 returns a response that the entity position volume is the search volume, the entity position is indicated by the GUDT of the search volume, and the entity position volume is not in the CAW state in S1220, and finishes this flow.

If the state of GUDT of the target slot is "Allocated" and the target slot is in the CAW state (S1210: CAW ON is detected), the copy process program 112 returns a response that the entity position volume is the search volume, the entity position is indicated by the GUDT of the search volume, and the entity position volume is in the CAW state in S1230, and finishes this flow.

If the state of the GUDT of the target slot is determined to be "Unallocated" (S1210: "Unallocated"), the copy process program 112 determines whether the state 375 of the target slot in the GCMT 370 of the search volume is "Allocated" or "Unallocated" in S1240.

If the state of GCMT of the target slot is "Allocated" (S1240: "Allocated"), the copy process program 112 returns a response that the entity position volume is the search volume, the entity position is indicated by the GCMT of the search volume, and the entity position volume is not in the CAW state in S1250, and finishes this flow.

If the state of the GCMT of the target slot is determined to be "Unallocated" (S1240: "Unallocated"), the copy process program 112 determines whether there is any younger brother generation of the search volume in S1260 or not.

If the younger brother generation is determined to be present (S1260: Yes), the copy process program 112 selects the volume of the younger brother generation immediately after the generation of the search volume as the new search volume in S1270, and causes the processing to transition to S1250.

If the younger brother generation is determined not to be present (S1260: No), the copy process program 112 determines whether there is a parent generation of the search volume in S1280 or not.

If the parent generation is determined not to be present (S1280: No), the copy process program 112 returns abnormality in S1310, and finishes this flow.

If the parent generation is determined to be present (S1280: No), the copy process program 112 selects the volume of the parent generation of the search volume as the new search volume in S1320, and causes the processing to transition to S1120.

According to the entity position search process described above, the SS control information 340 is traced, thereby allowing the entity position of data in the target slot of the elimination target volume to be identified.

The details of the aforementioned old data save process in S1540 are described.

Figure 14:
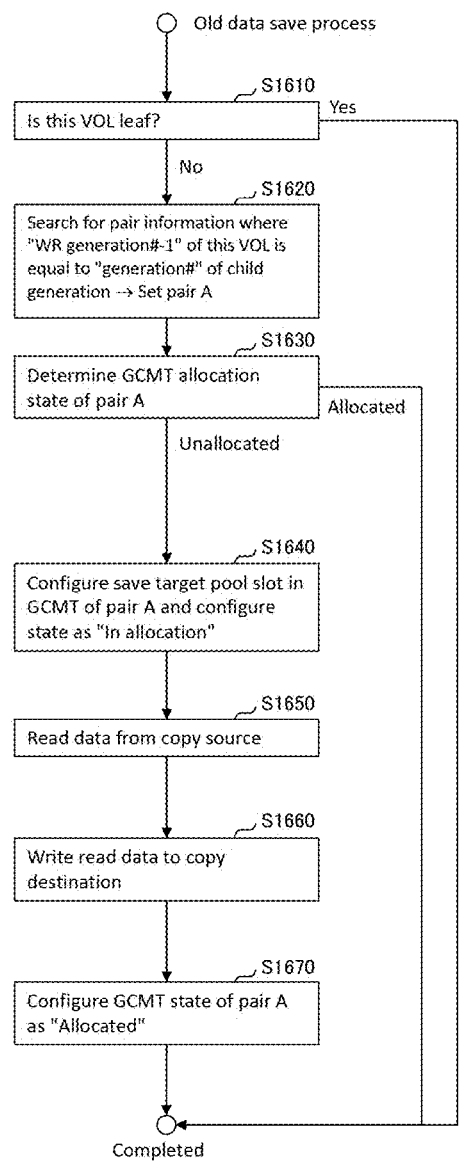
FIG. 14 shows an old data save process.

FIG. 14 shows the old data save process.

First, in S1610, the copy process program 112 determines whether the elimination target volume is the Leaf or not on the basis of the attribute 312 of the volume information table 310 of the elimination target volume. Here, if the attribute 312 only indicates the S-VOL attribute, the copy process program 112 determines that the elimination target volume is the Leaf.

If the elimination target volume is determined as the Leaf (S1610: Yes), the copy process program 112 finishes this flow because there is no pair where the elimination target volume is the primary volume and there is no need to save the old data.

If the elimination target volume is determined not to be the leaf (S1610: No), the copy process program 112 selects, as a pair A, a pair where the generation number is equal to the WR generation number of the elimination target volume-1 among pairs (child-generation pairs) where the elimination target volume is the primary volume in S1620. Here, the copy process program 112 refers to the information 323 on the target slot of the slot information 320 on the elimination target volume, and the generation number 333 in the pair information table 330 where the elimination target volume is the primary volume in the pair information table 330 indicated by the pair information table pointer 314 in the volume information table 310. Here, the secondary volume of the pair A is called the save destination volume.

Subsequently, the copy process program 112 determines whether the state 375 of the target slot in the GCMT 370 of the pair A in the save destination volume is "Allocated" or not in S1630.

If the state of the target slot of the save destination volume is determined to be "Allocated" (S1630: "Allocated"), the copy process program 112 finishes this flow because the old data has already been saved.

If the state of the target slot of the save destination volume is determined to be "Unallocated" (S1630: Unallocated), the copy process program 112 secures the save destination pool slot, registers the save destination pool slot (the pool number 376 and the pool entry number 377) in the pool information on the target slot in the GCMT 370 of the pair A, changes the state 375 to "In allocation", and stores the cache slot corresponding to the target slot of the save destination volume as the save destination cache slot, in S1640.

Subsequently, the copy process program 112 reads data from the entity position obtained by the entity position search process into the cache slot corresponding to the target slot of the entity position volume (copy source volume) in S1650. Subsequently, the copy process program 112 writes the read data onto the W face of the save destination cache slot in S1660. Subsequently, the copy process program 112 changes the state 275 of the target slot in the GCMT 370 of the pair A to "Allocated" in S1670, and finishes this flow.

Subsequently, the I/O process program 113 writes the data stored on the W face of the save destination cache slot into the save destination pool slot through destaging.

According to the old data save process described above, the copy process program 112 saves the data before update due to the WR data into the target slot of the volume of the generation of the save destination. The copy process program 112 compares the WR generation number of the target slot in the target volume with the generation number of the pair with the child-generation volume of the target volume, thereby allowing the save destination volume to be selected. The copy process program 112 can determine whether the data in the target slot in the target volume has already been saved or not.

Figure 15:
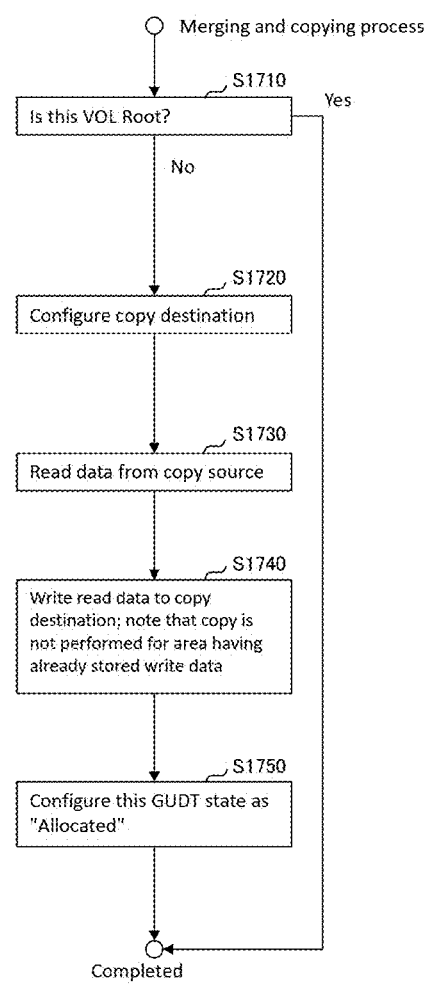
FIG. 15 shows a merging and copying process.

FIG. 15 shows the merging and copying process.

First, in S1710, the copy process program 112 determines whether the elimination target volume is the Root or not on the basis of the attribute 312 of the volume information table 310 of the elimination target volume. Here, if the attribute 312 only indicates the P-VOL attribute, the copy process program 112 determines that the elimination target volume is the Root.

If the elimination target volume is determined as the Root (S1710: Yes), the copy process program 112 finishes this flow because there is no pair where the elimination target volume is the secondary volume and there is no data to be merged.

If the elimination target volume is determined not to be the Root (S1710: No), the copy process program 112 stores the cache slot corresponding to the target slot of the elimination target volume as the copy destination cache slot in S1720.

Subsequently, the copy process program 112 reads data from the entity position obtained by the entity position search process into the cache slot corresponding to the target slot of the entity position volume (copy source volume) in S1730. Subsequently, the copy process program 112 writes the read data into an area other than the address range of the WR data on the W face of the copy destination cache slot in S1740. Subsequently, the copy process program 112 changes the state 385 of the target slot in the GUDT 380 of the elimination target volume to "Allocated" in S1750, and finishes this flow.

Subsequently, the I/O process program 113 writes the data stored on the W face of the copy destination cache slot into the pool slot indicated in the target slot of the GUDT 380 of the elimination target volume.

According to the merging and copying process described above, the copy process program 112 can write the data updated due to the WR data into the target slot of the elimination target volume.

Example 2

Figure 16:
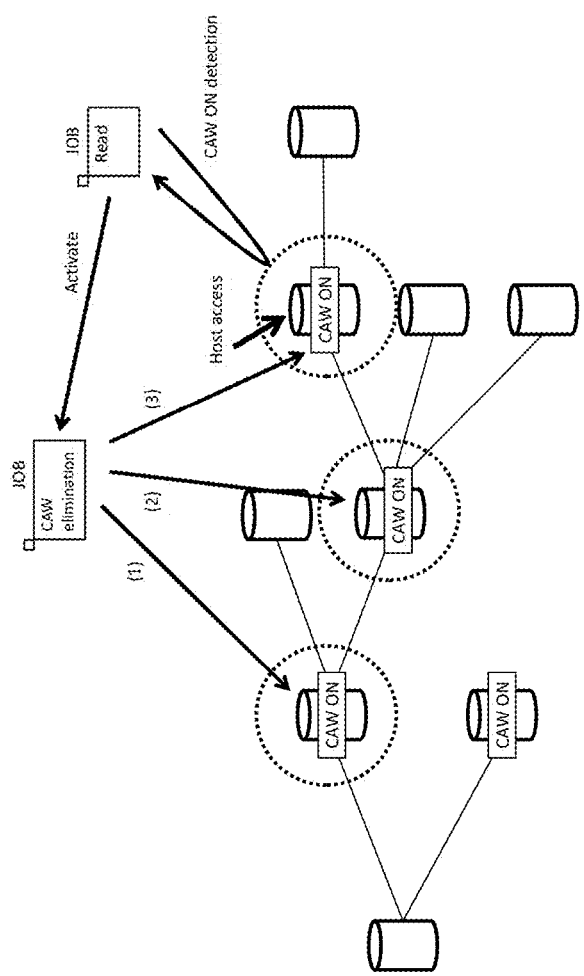
FIG. 16 shows an overview of a CAW elimination process in Embodiment 2.

FIG. 16 shows an overview of the CAW elimination process in Embodiment 2.

A CAW elimination job consumes resources, such as memories, in the storage apparatus 10. Consequently, in Embodiment 1, the CAW elimination job activates a new CAW elimination job, which sometimes consumes many resources. In this Embodiment, one CAW elimination job sequentially eliminates the CAW state of the multiple volumes (1, 2 and 3), thereby saving the resources.

Figure 17:
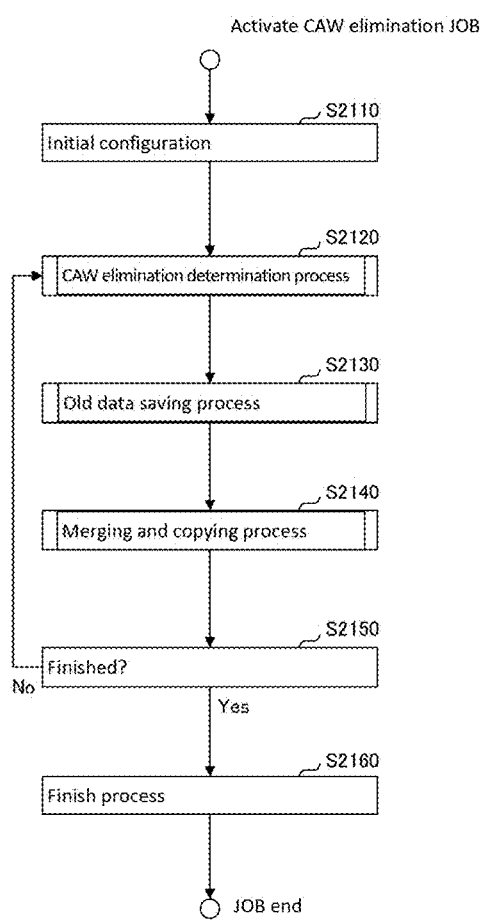
FIG. 17 shows a CAW elimination job in Embodiment 2.

FIG. 17 shows the CAW elimination job in Embodiment 2.

Subsequently, a volume to be accessed through the read job or the like is called an access volume. A slot to be accessed is called a target slot.

First, in 52110, the copy process program 112 makes the initial configuration of the CAW elimination job on the basis of the job management table.

Subsequently, in S2120, the copy process program 112 performs the CAW elimination target determination process, identifies, as the elimination target volume, the top level volume where the target slot is in the CAW state, with the access volume being adopted as the start point, and identifies the copy source volume of the old data save process and the merging and copying process.

Subsequently, in 52130, the copy procesprogram 112 performs the aforementioned old data save process from the copy source volume to the save destination volume of the elimination target volume. Subsequently, in 52140, the copy process program 112 performs the aforementioned merging and copying process from the copy source volume to the elimination target volume. Subsequently, in S2150, the copy process program 112 determines whether to finish the CAW elimination job or not. Here, if the elimination target volume is the access volume, the copy process program 112 can determine to finish the CAW elimination job.

If it is determined not to finish the CAW elimination job (S2150: No), the copy process program 112 causes the processing to transition to S2120, and selects the next elimination target volume.

If it is determined to finish the CAW elimination job (S2150: Yes), the copy process program 112 performs the finish process for the CAW elimination job in S2160, and finishes this flow.

According to the CAW elimination job described above, one CAW elimination job can eliminate the CAW state of multiple volumes, for eliminating the CAW state of the target slot of the access volume.

The details of the aforementioned CAW elimination target determination process in S2120 are described.

Figure 18:
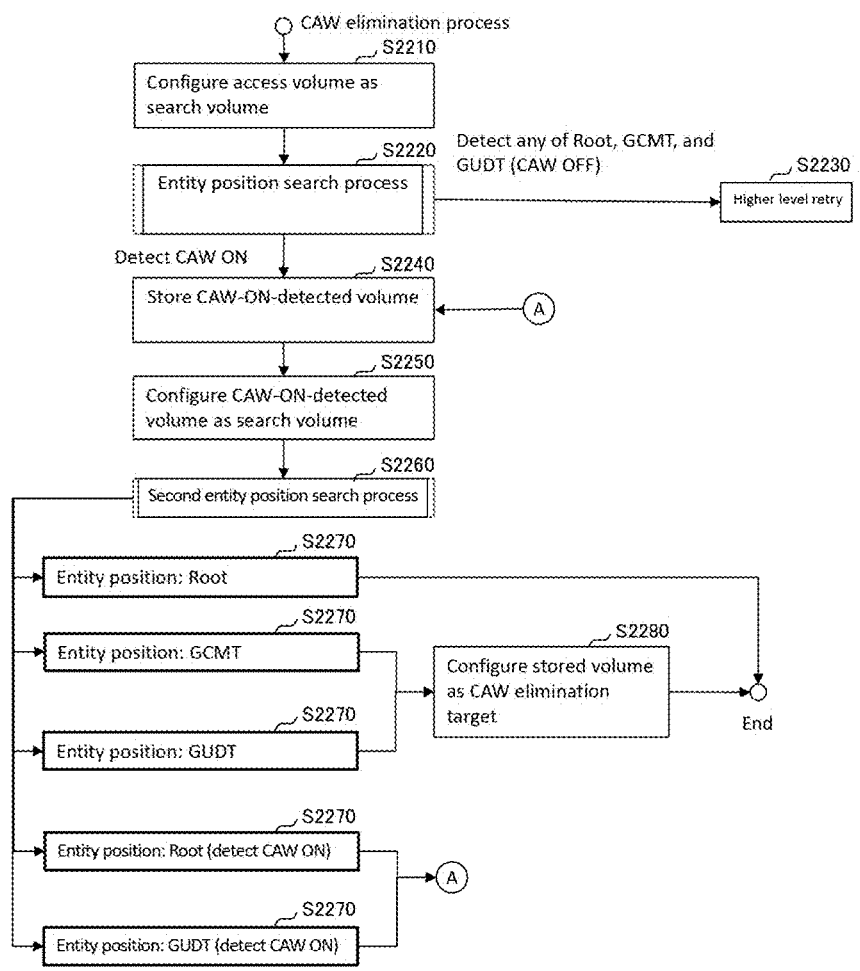
FIG. 18 shows a CAW elimination target determination process in Embodiment 2.

FIG. 18 shows the CAW elimination target determination process in Embodiment 2.

First, in S2210, the copy process program 112 selects the access volume as the search volume. Subsequently, in S2220, the copy process program 112 performs the entity position search process described above, and determines whether the target slot of the entity position volume is in the CAW state or not on the basis of the result of the process.

If the target slot of the entity position volume is determined not to be in the CAW state (S2220: any of Root, GCMT and GUDT (CAW OFF) is detected), the copy process program 112 performs retry through the activation source job of the CAW elimination job in S2230, and finishes this flow.

If the target slot of the entity position volume is determined to be in the CAW state (S2220: CAW ON is detected), the copy process program 112 stores the entity position volume as the CAW volume in S2240, and selects the CAW volume as the search volume in S2250. Subsequently, in S2260, the copy process program 112 performs a second entity position search process for the search volume, and determines the obtained entity position.

If it is determined that the entity position volume is the Root and the target slot of the entity position volume is not in the CAW state (S2260: Root), the copy process program 112 selects the Root as the elimination target volume and selects the Root as the copy source volume in S2270, and finishes this flow.

If it is determined that the entity position is indicated by the GCMT of the entity position volume (S2260: GCMT) or that the entity position is indicated by the GUDT of the entity position volume and the target slot of the entity position volume is not in the CAW state (S2260: GUDT), the copy process program 112 selects the CAW volume as the elimination target volume and selects the entity position volume as the copy source volume in S2280, and finishes this flow.

If it is determined that the entity position is the Root and the target slot of the entity position volume is in the CAW state (S2260: Root (detect CAW ON)) or that the entity position is indicated by the GUDT of the entity position volume and the target slot of the entity position volume is in the CAW state (S2260: GUDT (detect CAW ON)), the copy process program 112 causes the processing to transition to S2240.

According to the CAW elimination target determination process described above, the copy process program 112 can detect the elimination target volume and the copy source volume.

The details of the aforementioned second entity position search process in S2260 are described.

Figure 19:
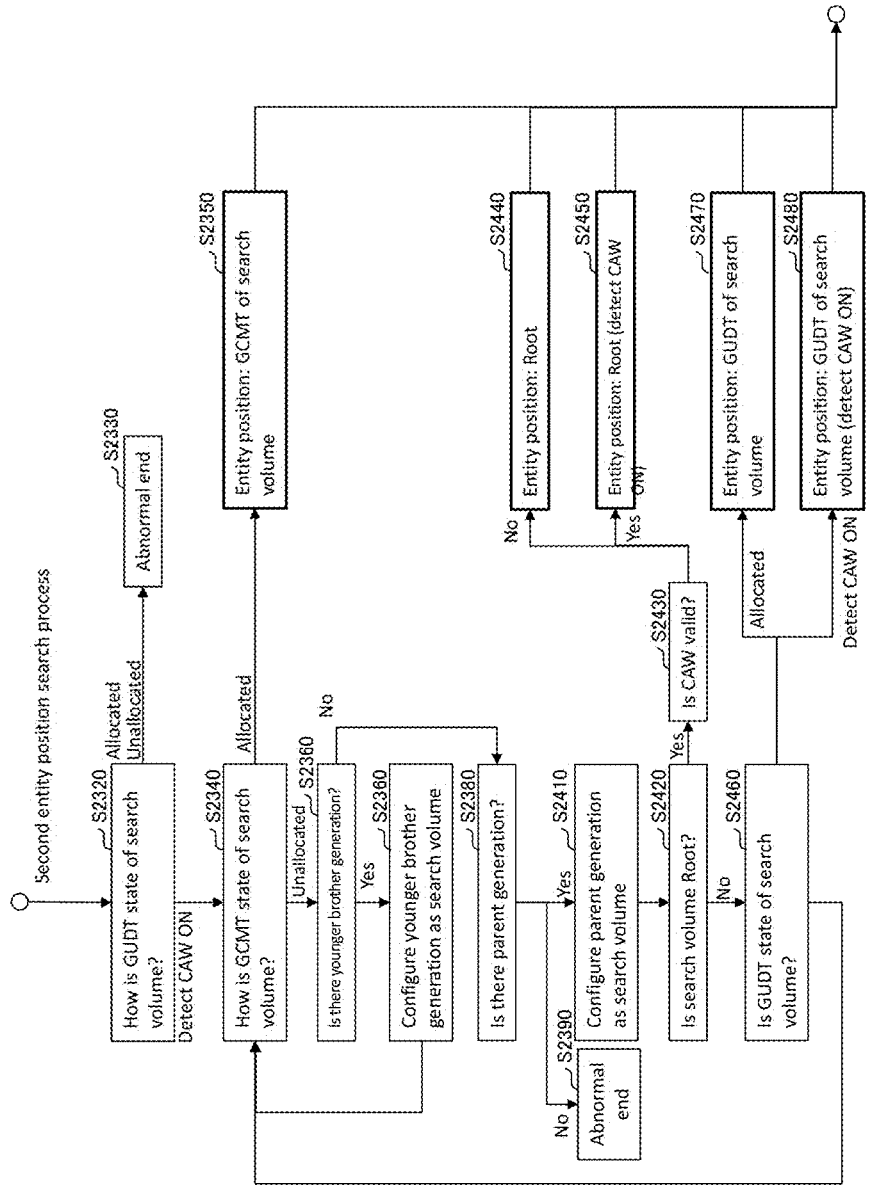
FIG. 19 shows a second entity position search process in Embodiment 2.

FIG. 19 shows the second entity position search process in Embodiment 2.

First, the copy process program 112 determines the state 385 of the target slot in the GUDT 380 in the search volume and the information 323 on the target slot in the slot information 320 on the search volume in S2320.

If the target slot of the search volume is determined not to be in the CAW state (S2320: Allocated, Unallocated), the copy process program 112 determines that it is an abnormal finish in S2330 because the CAW state cannot be detected, and finishes this flow.

If the target slot of the search volume is determined to be in the CAW state (S2320: Detect CAW ON), the copy process program 112 determines whether the state 375 of the target slot in the GCMT 370 of the search volume is "Unallocated" or not in S2340.

If the state 375 of the target slot in the GCMT 370 is determined not to be "Unallocated" (S2340: Allocated), the copy process program 112 returns a response that the entity position volume is the search volume, the entity position is indicated by the GCMT of the entity position volume, and the target slot of the entity position volume is not in the CAW state in S2350, and finishes this flow.

If the state 375 of the target slot in the GCMT 370 of the search volume is determined to be "Unallocated" (S2340: Unallocated), the copy process program 112 determines whether there is any younger brother generation of the search volume in S2360 or not.

If the younger brother generation is determined to be present (S2360: Yes), the copy process program 112 selects the volume of the younger brother generation immediately after the search volume as the new search volume in S2370, and causes the processing to transition to S2340.

If the younger brother generation is determined not to be present (S2360: No), the copy process program 112 determines whether there is a parent generation of the search volume in S2380 or not.

If the parent generation is determined not to be present (S2380: No), the copy process program 112 determines that it is an abnormal finish in S2390, and finishes this flow.

If the parent generation is determined to be present (S2380: Yes), the copy process program 112 selects the volume of the parent generation of the search volume as the new search volume in S2410. Subsequently, in S2420, the copy process program 112 determines whether the search volume is the Root or not.

If the search volume is determined as the Root (S2420: Yes), the copy process program 112 refers to the information 323 on the target slot in the slot information 320 on the search volume, and determines whether the target slot of the search volume is in the CAW state or not in S2430.

If the target slot is determined not to be in the CAW state (S2430: No), the copy process program 112 issues a response that the entity position volume is the Root and the target slot of the Root is not in the CAW state in S2440, and finishes this flow.

If the target slot is determined to be in the CAW state (S2430: Yes), the copy process program 112 issues a response that the entity position volume is the root and the target slot of the Root is in the CAW state in S2450, and finishes this flow.

If the search volume is determined not to be the Root (S2420: No), the copy process program 112 determines the state 385 of the target slot in the GUDT 380 in the search volume and the information 323 on the target slot in the slot information 320 on the search volume in S2460.

If the state of GUDT is determined to be "Unallocated" (S2460: Unallocated), the copy process program 112 causes the processing to transition to S2340.

If the state of GUDT is "Allocated" and the target slot is not in the CAW state (S2460: "Allocated"), the copy process program 112 returns a response that the entity position volume is the search volume, the entity position is indicated by the GUDT of the search volume, and the target slot of the entity position volume is not in the CAW state in S2470, and finishes this flow.

If the state of GUDT is "Allocated" and the target slot of the search volume is in the CAW state (S2460: Detect CAW ON), the copy process program 112 returns a response that the entity position volume is the search volume, the entity position is indicated by the GUDT of the entity position volume, and the target slot of the entity position volume is in the CAW state in S2480, and finishes this flow.

According to the second entity position search described above, the copy process program 112 can detect, as the entity position volume, the highest level volume where CAW state of the target slot is to be eliminated.

Example 3

Figure 20:
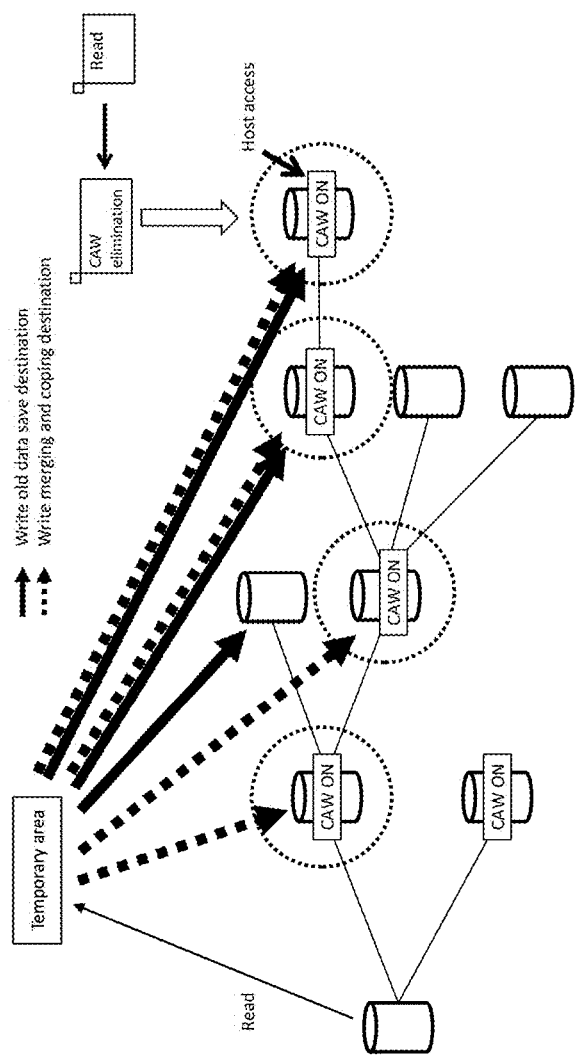
FIG. 20 shows an overview of a CAW elimination process in Embodiment 3.

FIG. 20 shows an overview of the CAW elimination process in Embodiment 3.

With a certain snapshot structure and a certain position of the volume in the CAW state, there is a possibility that data as the copy source for eliminating the CAW state is common. The copy process program 112 in this Embodiment generates a copy list that indicates the copy source and copy destination for eliminating multiple CAW states, and performs copying on the basis of the copy list. The copy process program 112 copies the data of one copy source to multiple copy destinations, thereby saving the resources of the storage apparatus 10.

FIG. 21 shows the copy list 410.

The copy list 410 includes a leading attribute 411, a leading SSID 412, and a list length 413. The copy list 410 includes a subscript 421, a CAW elimination target SSID 422, copy source data information 423, old data saving necessity 424, an old data save destination SSID 425, merging and copying necessity 426, and a copy state 427, as volume elements, on an element-by-element basis.

The leading attribute 411 is the attribute of the highest-level copy source volume having been retrieved, and indicates any of the Root, GCMT and GUDT. The leading SSID 412 is the SSID of the highest-level copy source volume. If the leading attribute 411 is the root, the leading SSID 412 is invalid. The list length 413 indicates the number of elements which include the subscript 421, the CAW elimination target SSID 422, the copy source data information 423, the old data saving necessity 424, the old data save destination SSID 425, the merging and copying necessity 426, and the copy state 427.

The subscript 421 is the number indicating the element. The CAW elimination target SSID 422 is the SSID of the volume where the target slot is in the CAW state. The copy source data information 423 indicates whether the data in the target slot of the copy source volume is old data "Old" or current data "Current". The old data saving necessity 424 indicates whether the old data save process is "Necessary" or "Unnecessary". The old data save destination SSID 425 indicates the SSID of the save destination volume if the old data save process is required. The merging and copying necessity 426 indicates whether merging and copying are "Necessary" or "Unnecessary". The copy state 427 indicates the processing state. "Not yet" indicates the initial state. "Middle" indicates the state of being selected as a copy target. "Completed" indicates that the elimination of the CAW state has been completed.

Figure 22:
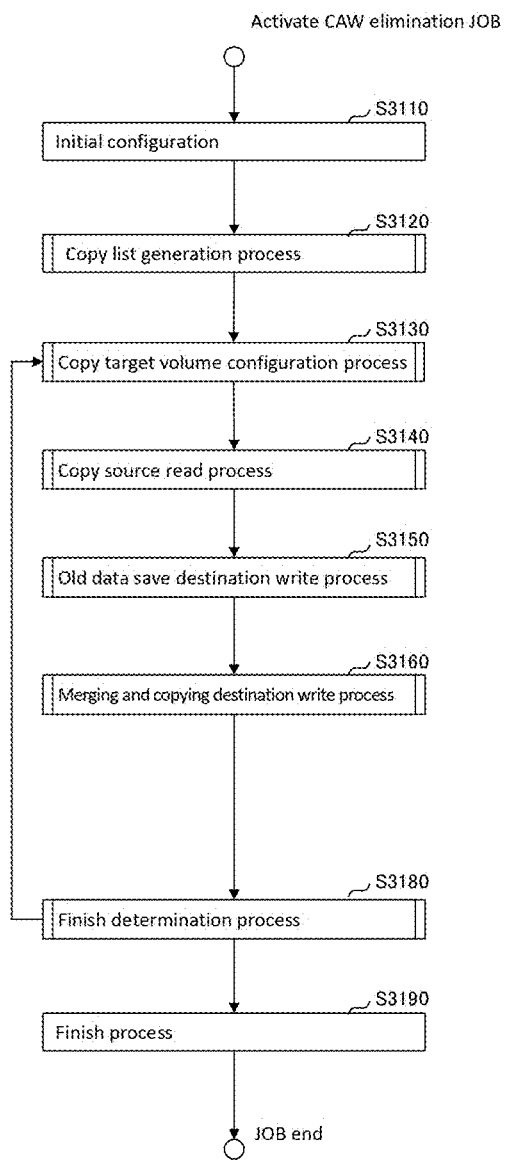
FIG. 22 shows a CAW elimination job in Embodiment 3.

FIG. 22 shows the CAW elimination job in Embodiment 3.

First, in 53110, the copy process program 112 makes the initial configuration of the CAW elimination job on the basis of the job management table. Subsequently, in S3120, the copy process program 112 performs the copy list generation process, thereby creating the copy list 410.

Subsequently, in S3130, the copy process program 112 performs the copy target volume configuration process. The copy target volume configuration process selects one copy source volume and at least one copy destination volume corresponding thereto as copy target volumes from the copy list, and records the selected state into the copy state 427 of the selected volume in the copy list 410. Subsequently, in S3140, the copy process program 112 performs the copy source read process. The copy source read process selects the copy source volume from the copy list 410, and reads the data in the target slot of the copy source volume into temporary area in the cache area.

Subsequently, in S3150, the copy process program 112 performs the old data save destination write process. The old data save destination write process writes the data in the temporary area into the target slot of the volume that requires the old data save process, among the selected copy destination volumes, on the basis of the copy list 410. Subsequently, in S3160, the copy process program 112 performs the merging and copying destination write process. The merging and copying destination write process writes the data in the temporary area into the target slot of the volume that requires the merging and copying, among the selected copy destination volumes, on the basis of the copy list 410.

Subsequently, in S3180, the copy process program 112 performs the finish determination process, thereby determining whether the CAW elimination process has been completed or not.

If the CAW elimination process is determined not to be completed (S3180: No), the copy process program 112 causes the processing to transition to S3130, and selects the next copy source volume.

If the CAW elimination process is determined to be completed (S3180: Yes), the copy process program 112 performs the finish process for the CAW elimination job in S3190, and finishes this flow.

According to the CAW elimination job described above, the copy process program 112 can reduce the number of reads from the copy source volume in comparison with Embodiments 1 and 2.

Here, the details of the aforementioned copy list generation process in S3120 are described.

Figure 23:
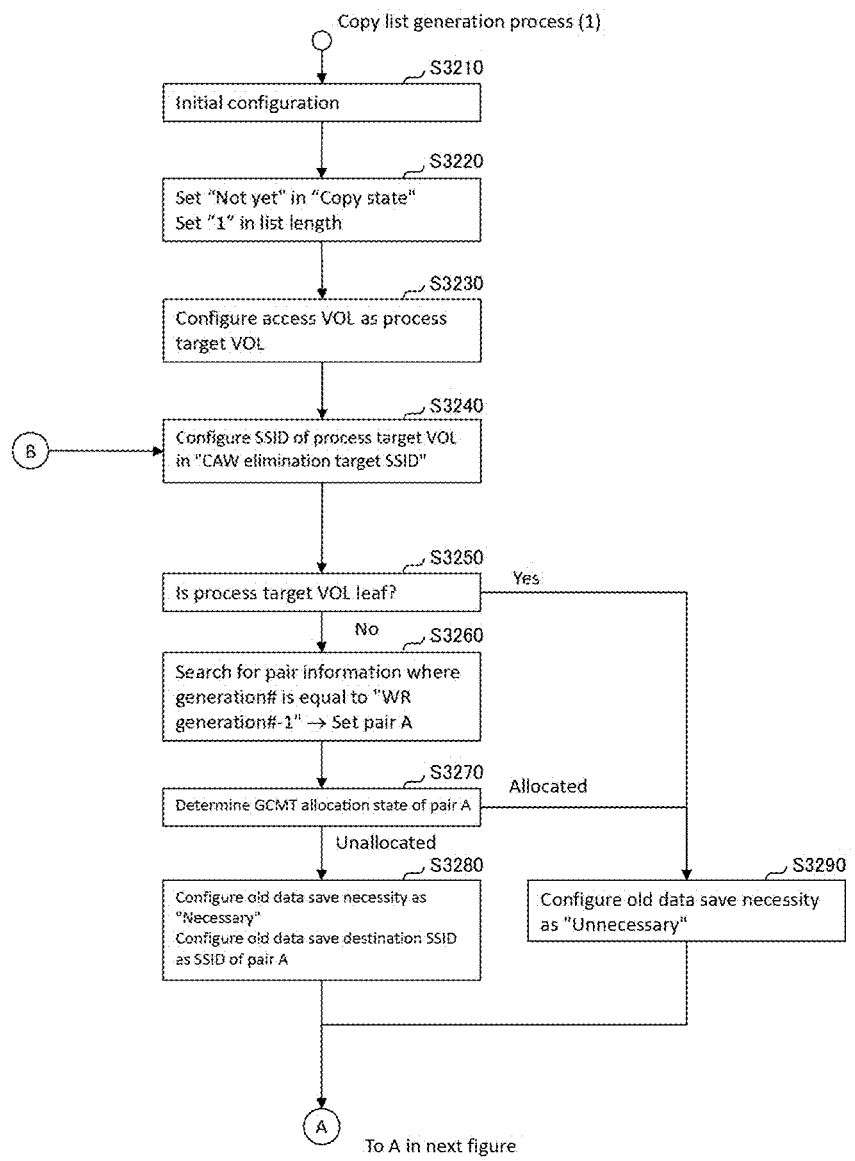
FIG. 23 shows a first part of a copy list generation process in Embodiment 3.
Figure 24:
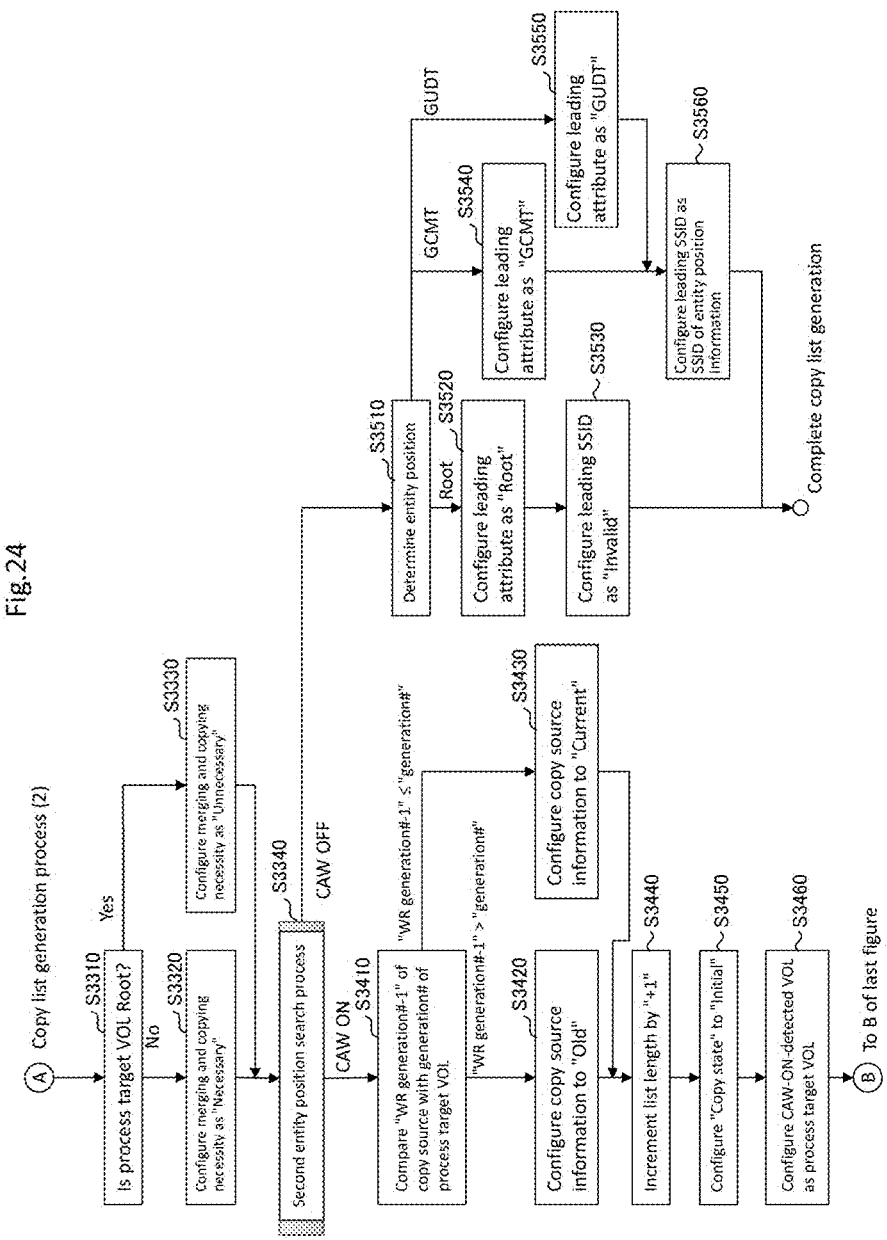
FIG. 24 shows a second part of the copy list generation process in Embodiment 3.

FIG. 23 shows a first part of the copy list generation process in Embodiment 3. FIG. 24 shows a second part of the copy list generation process in Embodiment 3.

First, in 53210, the copy process program 112 initializes the copy list. Subsequently, in S3220, the copy process program 112 generates one element in the copy list, records "Initial" in the copy state 427, and records one in the list length 413. Subsequently, in 53230, the copy process program 112 selects the access volume as the process target volume.

Subsequently, in S3240, the copy process program 112 records the SSID of the pair where the process target volume is the secondary volume, into the CAW elimination target SSID 422.

Subsequent S3250 to S3290 configure information for the old data save destination write process.

In S3250, the copy process program 112 determines whether the process target volume is the Leaf or not on the basis of the volume information table 310.

If the process target volume is determined to be the Leaf (S3250: Yes), the copy process program 112 records "Unnecessary" into the old data saving necessity 424 in S3290 and causes the processing to transition to S3310.

If the process target volume is determined not to be the Leaf (S3250: No), the copy process program 112 adopts the process target volume as the primary volume on the basis of the pair information table 330, and selects, as the pair A, the pair having the generation number equal to the WR generation number of the target slot-1 in S3260. That is, the pair A is the pair that is generated immediately before the process target volume is written and serves as the save destination of the old data of the process target volume. Subsequently, the copy process program 112 determines whether the state of the GCMT of the target slot of the pair A is "Allocated" or not in S3270.

If the state of GCMT is determined to be "Allocated" (S3270: Allocated), the copy process program 112 causes the processing to transition to S3290 described above.

If the state of GCMT is "Unallocated" (S3270: Unallocated), the copy process program 112 records "Necessary" into the old data saving necessity 424, and records the SSID of the pair A into the old data save destination SSID 425 in 53280, and causes the processing to transition to S3310 (A in the figure).

Subsequent S3310 to S3330 configure information for the merging and copying write process.

In S3310, the copy process program 112 determines whether the process target volume is the Root or not. If the process target volume is determined not to be the Root (S3310: No), the copy process program 112 records "Necessary" into the merging and copying necessity 426 in S3320 and causes the processing to transition to S3340. If the process target volume is determined to be the Root (S3310: Yes), the copy process program 112 records "Unnecessary" into the merging and copying necessity 426 in S3330 and causes the processing to transition to S3340.

Subsequently, in S3340, the copy process program 112 performs the second entity position search process described above, with the process target volume being adopted as the search volume, and determines whether the target slot of the obtained entity position volume is in the CAW state or not.

If the target slot of the entity position volume is determined to be in the CAW state (S3340: CAW ON), subsequent S3410 to S3430 configure information on the copy source.

In S3410, the copy process program 112 determines whether the WR generation number-1, this number being of the target slot of the copy source volume (primary volume) that is the process target volume, is larger than the generation number of the process target volume or not.

If the WR generation number-1, this number being of the target slot of the copy source volume, is determined to be larger than the generation number of the process target volume (S3410: Yes), the pair of the copy source volume and the process target volume is generated, subsequently, the target slot of the copy source volume is updated, and the copy process program 112 registers "Old" into the copy source data information 423 in S3420 to indicate that the data in the process target volume is the old data in the copy source volume.

If the WR generation number-1, this number being of the target slot of the copy source volume, is determined to be equal to or smaller than the generation number of the process target volume (S3410: No), the target slot of the copy source volume is updated, subsequently, the pair of the copy source volume and the process target volume is generated, and the copy process program 112 registers "Current" into the copy source data information 423 in S3430 to indicate that the data in the process target volume is the current data in the copy source volume.

Subsequently, in S3440, the copy process program 112 adds one to the list length 413, registers "Initial" into the copy state 427 in S3450, selects the entity position volume as the process target volume in S3460, and causes the processing to transition to S3240 (B in the figure) described above.

If the target slot of the entity position volume is determined not to be in the CAW state (S3340: CAW OFF), the copy process program 112 determines the entity position in S3510.

If the entity position volume is determined to be the Root (S3510: Root), the copy process program 112 records Root into the leading attribute 411 in S3520, records Invalid into the leading SSID 412 in S3530, and finishes this flow.

If the entity position is determined to be indicated by the GCMT of the entity position volume (S3510: GCMT), the copy process program 112 records GCMT into the leading attribute 411 in S3540, records the SSID of the entity position volume into the leading SSID 412 in S3560, and finishes this flow.

If the entity position is determined to be indicated by the GUDT of the entity position volume (S3510: GUDT), the copy process program 112 records GCMT into the leading attribute 411 in S3550, records the SSID of the entity position volume into the leading SSID 412, and finishes this flow.

According to the copy list generation process described above, the copy process program 112 can create the copy list 410 that indicates the configurations of the copy target volume configuration process, the copy source read process, the old data save destination write process, and the merging and copying destination write process. In the copy list 410, the volumes that are the elements are arranged in the ascending order of the subscript 421 from the access volume to the higher level volume. The example of the figure in the copy list 410 described above indicates the state after the copy list generation process.

Here, the details of the aforementioned copy target volume configuration process in S3130 are described.

Figure 25:
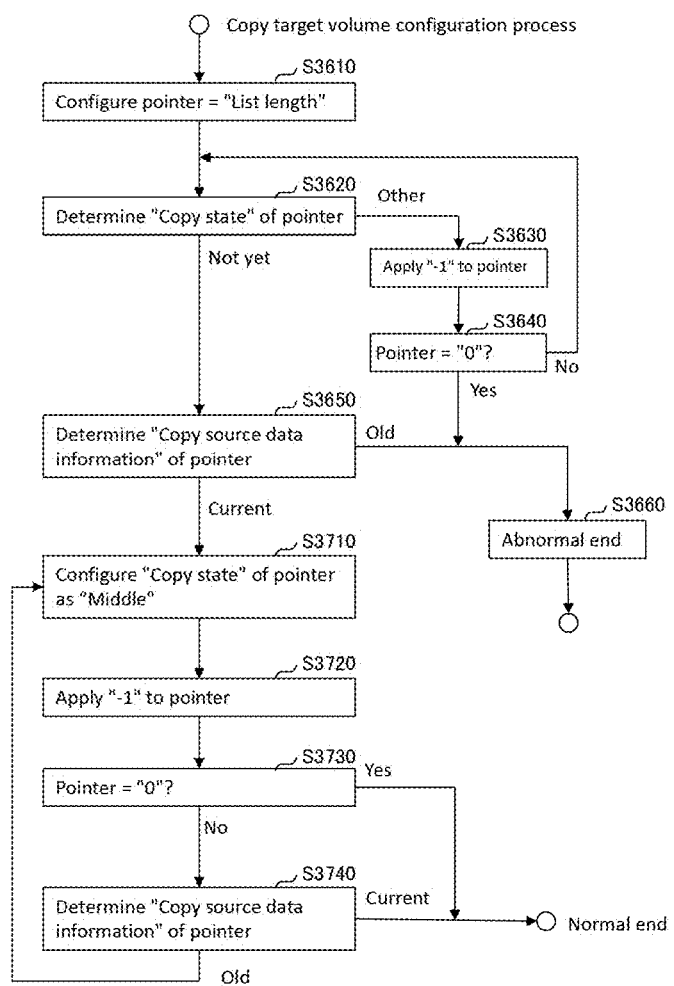
FIG. 25 shows a copy target volume configuration process in Embodiment 3.

FIG. 25 shows the copy target volume configuration process in Embodiment 3.

First, in 53610, the copy process program 112 substitutes the list length 413 into the pointer for designating the subscript 421 of the element of the copy list 410. Subsequently, in S3620, the copy process program 112 determines whether the copy state 427 of the element indicated by the pointer is "Not yet" or not.

If the copy state 427 is determined not to be "Not yet" (S3620: Other), the copy process program 112 subtracts one from the pointer in S3630, and determines whether the pointer is zero or not in S3640.

If the pointer is determined not to be zero (S3640: No), the copy process program 112 causes the processing to transition to S3620, and determines the following element.

If the pointer is determined to be zero (S3640: Yes), the copy process program 112 determines that it is an abnormal finish in S3660, and finishes this flow.

If the copy state 427 is determined to be "Not yey" (S3620: Not yet), the copy process program 112 determines whether the copy source data information 423 on the element indicated by the pointer is "Current" or not in S3650.

If the copy source data information 423 is determined to be "Old" (S3650: Old), the copy process program 112 causes the processing to transition to S3660 described above.

If the copy source data information 423 is determined to be "Current" (S3650: Current), the copy process program 112 records Middle into the copy state 427 of the element indicated by the pointer in S3710, subtracts one from the pointer in S3720, and determines whether the pointer is zero or not in S3730.

If the pointer is determined to be zero (S3730: Yes), the copy process program 112 finishes this flow.

If the pointer is determined not to be zero (S3730: No), the copy process program 112 determines whether the copy source data information 423 on the element indicated by the pointer is Current or not in S3740.

If the copy source data information 423 is determined to be Current (S3740: Current), the copy process program 112 finishes this flow.

If the copy source data information 423 is determined to be "Old" (S3740: Old), the copy process program 112 causes the processing to transition to S3710.

According to the copy target volume configuration process described above, among the volumes indicated by the copy list 410, in the order from the higher level volume (the descending order of the subscript 421), the copy process program 112 can adopt the volume where the copy source data information 423 is "Current" (the secondary volume of the pair generated after the parent-generation WR) as the copy source volume, adopt the subsequently consecutive "Old" volume (the secondary volume of the pair generated before the parent-generation WR) as the copy destination volume, select the group thereof as the copy target volumes, and change their copy states 427 to "Middle".

In the example of the copy list 410 described above, the first copy target volume configuration process selects the volumes with subscripts from five to three as copy target volumes, and the next copy target volume configuration process selects the volumes with subscripts from two to one as copy target volumes.

Here, the details of the aforementioned copy source read process in S3140 are described.

Figure 26:
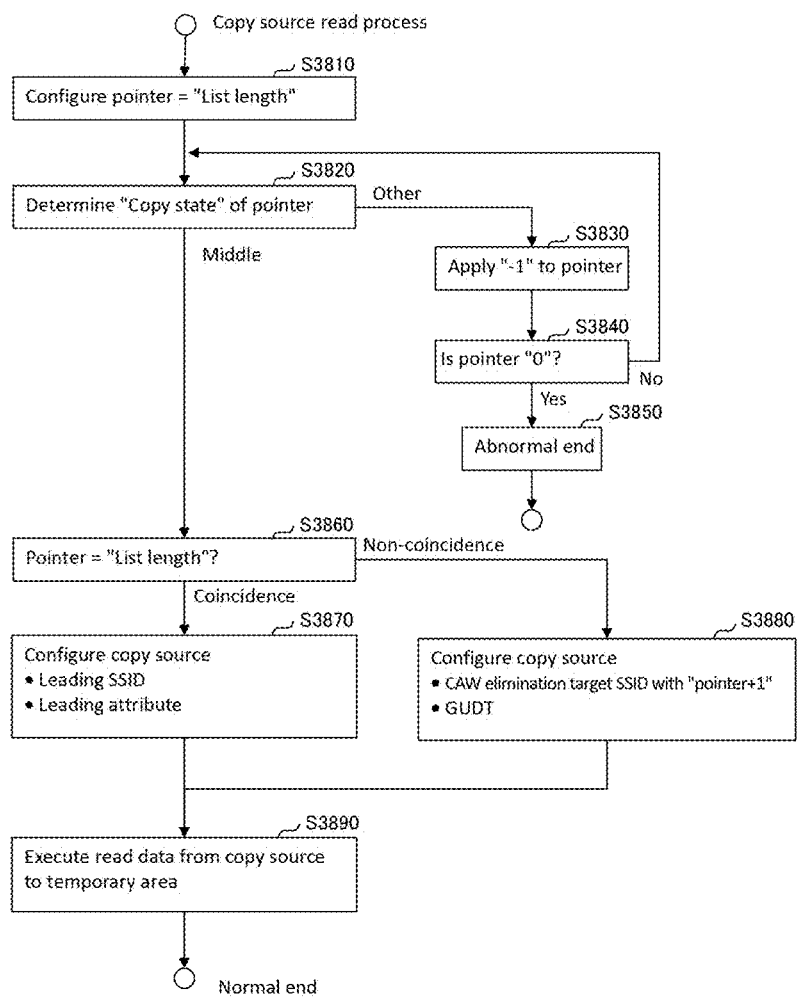
FIG. 26 shows a copy source read process in Embodiment 3.

FIG. 26 shows a copy source read process in Embodiment 3.

First, in S3810, the copy process program 112 substitutes the list length 413 into the pointer designating the subscript 421. Subsequently, in S3820, the copy process program 112 determines whether the copy state 427 of the element indicated by the pointer is "Middle" or not.

If the copy state 427 is determined not to be "Middle" (S3820: Other), the copy process program 112 subtracts one from the pointer in S3830, and determines whether the pointer is zero or not in S3840.

If the pointer is determined not to be zero (S3840: No), the copy process program 112 causes the processing to transition to S3820, and determines the following element.

If the pointer is determined to be zero (S3840: Yes), the copy process program 112 determines that it is an abnormal finish in S3850, and finishes this flow.

If the copy state 427 is determined to be "Middle" (S3820: Middle), the copy process program 112 determines whether the pointer coincides with the list length 413 or not.

If the pointer is determined to coincide with the list length 413 (S3860: Coincidence), the copy process program 112 selects the volume indicated by the leading SSID 412 and the leading attribute 411 as the copy source volume in S3870, and causes the processing to transition to S3890.

If the pointer is determined not to coincide with the list length 413 (S3860: Coincidence), the copy process program 112 selects the volume indicated by the CAW elimination target SSID 422 of the element with pointer+1 as the copy source volume in S3880, obtains the entity position indicated by the GUDT of the target slot in the volume, and causes the processing to transition to S3890.

Subsequently, the copy process program 112 reads the data stored at the entity position of the target slot of the copy source volume into the temporary area in S3890, and finishes this flow.

According to the copy source read process described above, the data in the highest level volume in the copy target volume can be read into the temporary area. For example, if the subscript of the highest level volume among the copy target volumes (the highest subscript among the subscripts of the copy target volumes) is equal to the list length 413, the copy process program 112 selects the volume indicated by the leading attribute 411 and the leading SSID 412 as the copy source volume for the first copy. If not, the copy process program 112 selects the lowest level volume among the copy target volumes last time (the volume with the highest subscript of the copy target volume this time+1) as the copy source volume.

In the example of the copy list 410 described above, the first copy source read process selects the Root as the copy source volume, and the next copy source read process selects the volume with the subscript of two as the copy source volume.

Here, the details of the aforementioned old data save destination write process in S3150 are described.

Figure 27:
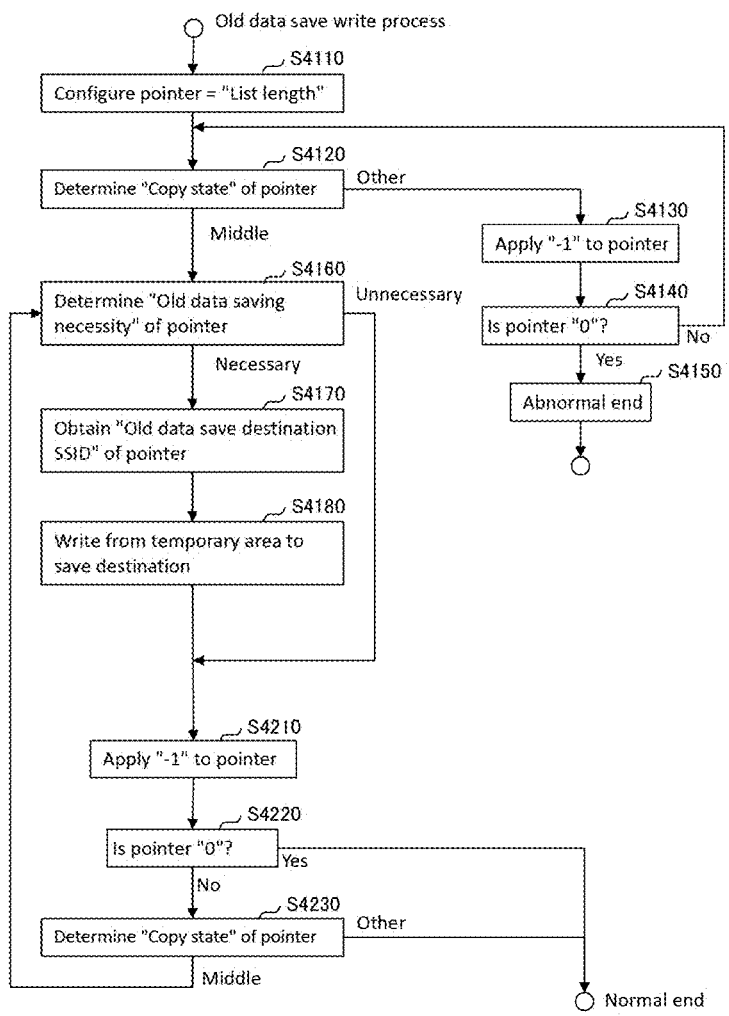
FIG. 27 shows an old data save destination write process in Embodiment 3.

FIG. 27 shows the old data save destination write process in Embodiment 3.

First, in 54110, the copy process program 112 substitutes the list length 413 into the pointer for designating the subscript 421 of the element. Subsequently, in S4120, the copy process program 112 determines whether the copy state 427 of the element indicated by the pointer is "Middle" or not.

If the copy state 427 is determined not to be "Middle" (S4120: Other), the copy process program 112 subtracts one from the pointer in S4130, and determines whether the pointer is zero or not in S4140.

If the pointer is determined not to be zero (S4140: No), the copy process program 112 causes the processing to transition to S4120, and determines the following element.

If the pointer is determined to be zero (S4140: Yes), the copy process program 112 determines that it is an abnormal finish in S4150, and finishes this flow.

If the copy state 427 is determined to be "Middle" (S4120: Middle), the copy process program 112 determines whether the old data saving necessity 424 of the element indicated by the pointer is "Necessary" or not in S4160.

If the old data saving necessity 424 is determined to be "Unnecessary" (S4160: No), the copy process program 112 causes the processing to transition to S4210.

If the old data saving necessity 424 is determined to be "Necessary" (S4160: Yes), the copy process program 112 selects, as the save destination volume, the volume indicated by the old data saving destination SSID 425 of the element indicated by the pointer in S4170, selects the cache slot corresponding to the target slot of the save destination volume as the save destination cache slot in S4180, and writes the data in the temporary area into the save destination cache slot.

Subsequently, in S4210, the copy process program 112 subtracts one from the pointer, and determines whether the pointer is zero or not in S4220.

If the pointer is determined to be zero (S4220: Yes), the copy process program 112 finishes this flow.

If the pointer is determined not to be zero (S4220: No), the copy process program 112 determines whether the copy state 427 of the element indicated by the pointer is "Middle" or not in S4230.

If the copy state 427 is determined to be "Middle" (S4230: Middle), the copy process program 112 causes the processing to transition to S4160, and determines the next element.

If the copy state 427 is determined not to be "Middle" (S4230: Other), the copy process program 112 finishes this flow.

According to the old data save destination write process described above, the copy process program 112 can write the data in the temporary area into the save destination volume. The copy process program 112 can select, as the save destination volume, the volume indicated by the old data save destination SSID 425 of the volume where the old data saving necessity 424 is "Necessary", among the copy target volumes.

Here, the details of the aforementioned merging and copying destination write process in S3160 are described.

Figure 28:
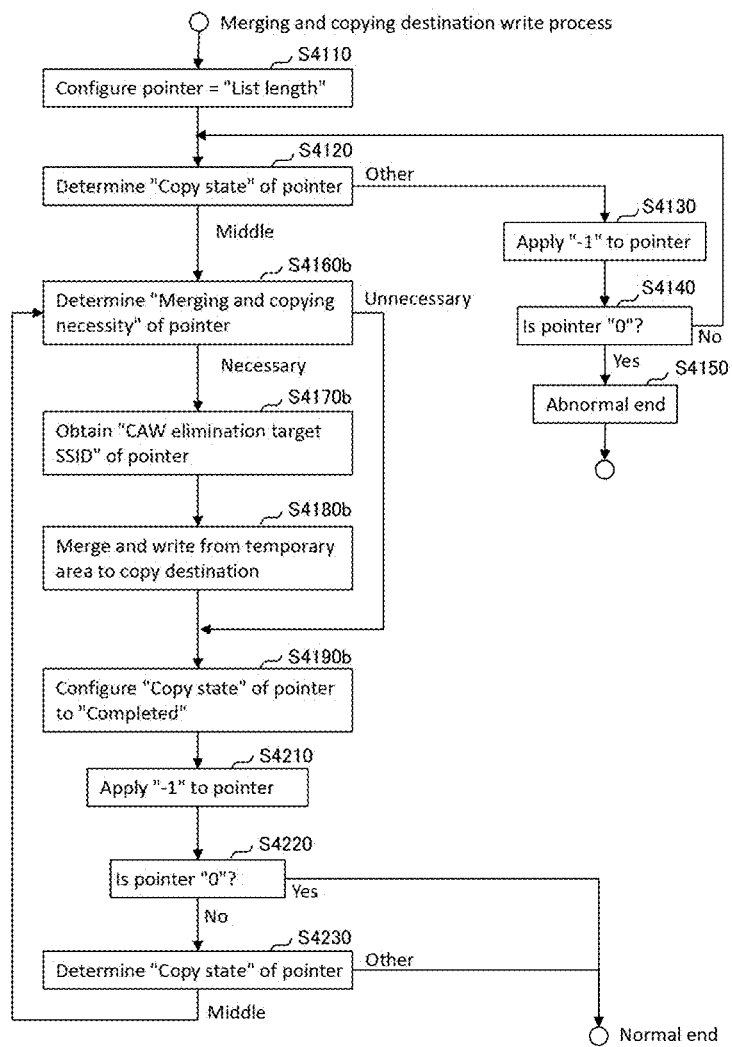
FIG. 28 shows a merging and copying destination write process in Embodiment 3.

FIG. 28 shows the merging and copying destination write process in Embodiment 3.

The first 54110 to S4150 in the merging and copying destination write process are analogous to those in the old data save destination write process described above.

If the copy state 427 is determined to be "Middle" (S4120: Middle), the copy process program 112 determines whether the merging and copying necessity 426 of the element indicated by the pointer is "Necessary" or not in S4160*b*.

If the merging and copying necessity 426 is determined to be "Unnecessary" (S4160*b*: No), the copy process program 112 causes the processing to transition to S4210.

If the merging and copying necessity 426 is determined to be "Necessary" (S4160*b*: Yes), the copy process program 112 selects, as the copy destination volume, the volume indicated by the CAW elimination target SSID 422 of the element indicated by the pointer in S4170*b*, selects the cache slot corresponding to the target slot of the copy destination volume as the copy destination cache slot in S4180*b*, and writes the data in the temporary area into the copy destination cache slot.

Subsequently, in 54190*b*, the copy process program 112 changes the copy state 427 of the element indicated by the pointer to "Completed".

Subsequent S4210 to S4230 are analogous to those in the old data save destination write process described above.

According to the merging and copying destination write process described above, the copy process program 112 can write the data in the temporary area into the pool slot of the merging and copying destination in each copy destination volume. The copy process program 112 can select, as the copy destination volume, the volume indicated by the CAW elimination target SSID 422 among the copy target volumes where the merging and copying necessity 426 is "Necessary".

Here, the details of the aforementioned finish determination process in S3170 are described.

Figure 29:
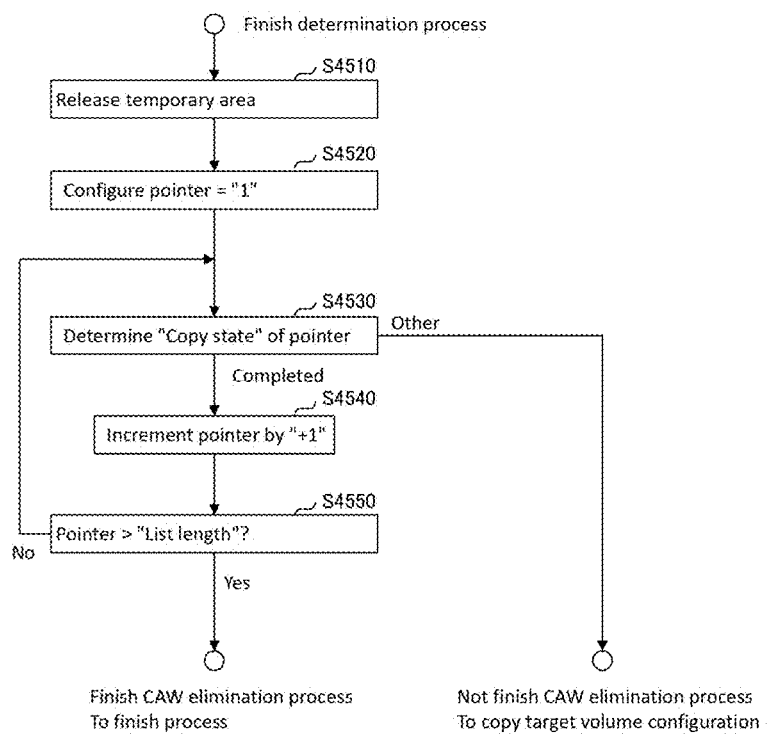
FIG. 29 shows a finish determination process in Embodiment 3.

FIG. 29 shows the finish determination process in Embodiment 3.

First, in S4510, the copy process program 112 releases temporary area. Subsequently, the copy process program 112 substitutes one into the pointer in S4520.

Subsequently, in S4530, the copy process program 112 determines whether the copy state 427 of the element indicated by the pointer is "Completed" or not.

If the copy state 427 is determined not to be "Completed" (S4530: Other), the copy process program 112 determines that the CAW elimination process is not completed, and finishes this flow.

If the copy state 427 is determined to be "Completed" (S4530: Completed), the copy process program 112 adds one to the pointer in S4540, and determines whether the pointer is larger than the value of the list length 413 or not in S4550.

If the pointer is determined to be equal to or smaller than the value of the list length 413 (S4550: No), the copy process program 112 causes the processing to transition to S4530, and determines the next element.

If the pointer is determined to have a value larger than the list length 413 (S4550: Yes), the copy process program 112 finishes this flow.

According to the finish determination process described above, the copy process program 112 can determine whether the CAW elimination process has been completed or not using the copy list 410.

Here, a modification example of Embodiment 3 is described.

Figure 30:
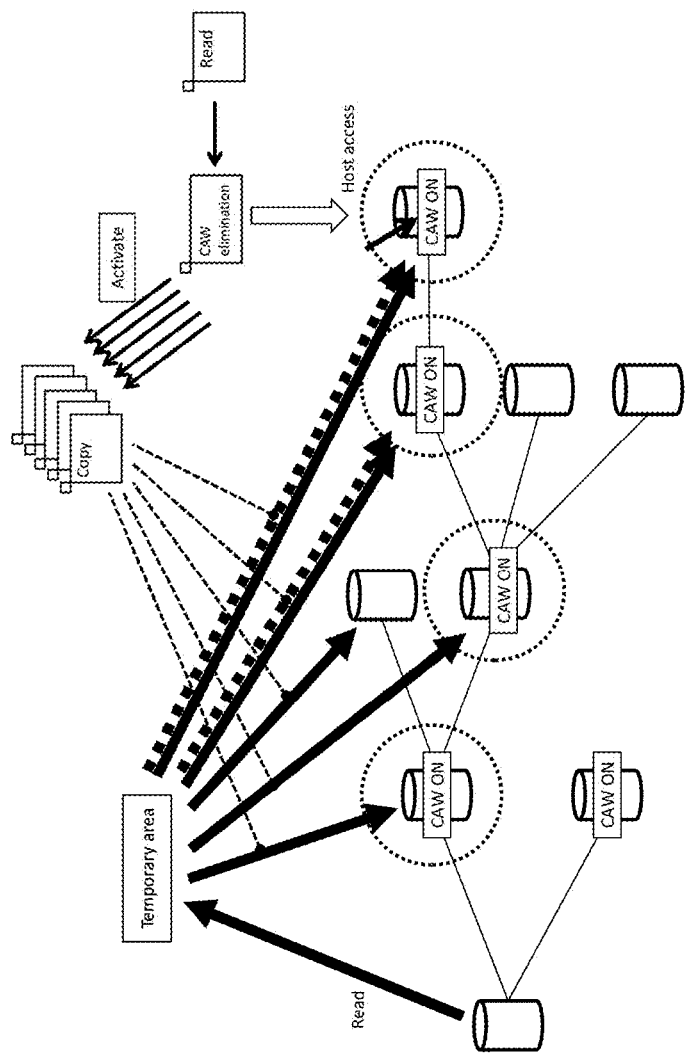
FIG. 30 shows an overview of a modification example of Embodiment 3.

FIG. 30 shows an overview of the modification example of Embodiment 3.

In the modification example of Embodiment 3, the CAW elimination job identifies the copy source and the copy destination in a manner analogous to that of Embodiment 3.

Subsequently, a copy process from the copy source to the copy destination is requested to another job. Accordingly, multiple copy jobs can operate in a multiplexed manner. Consequently, the process time can be reduced in comparison with Embodiment 3. Meanwhile, resources for the multiple copy jobs are required.

Figure 31:
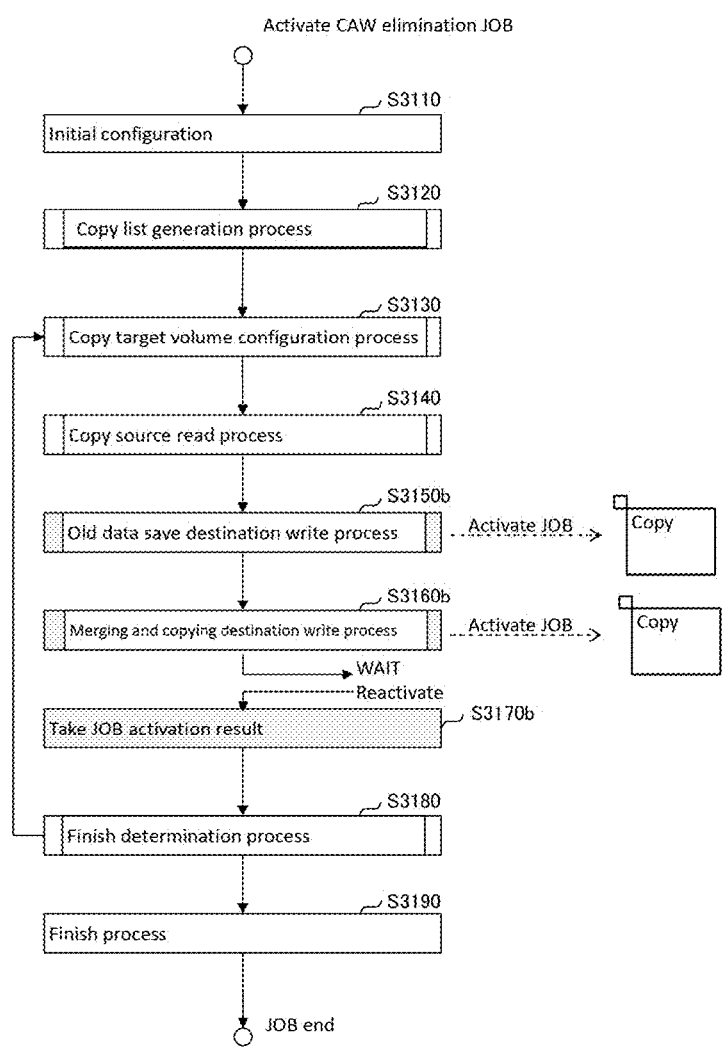
FIG. 31 shows a CAW elimination job in the modification example of Embodiment 3.

FIG. 31 shows the CAW elimination job in the modification example of Embodiment 3.

The first 53110 to S3140 in the CAW elimination job in the modification example are analogous to those of the CAW elimination job in Embodiment 3.

Subsequently, in S3150*b*, the copy process program 112 activates a job of a process analogous to that of the old data save destination write process in S3150. Subsequently, in S3160*b*, the copy process program 112 activates a job of a process analogous to that of the merging and copying destination write process in S3160, and stands by until the activated job is finished.

Subsequently, in S3170*b*, the copy process program 112 obtains the result of the job in S3150*b* and S3160*b*. Subsequent S3180 to 3190 are analogous to those of the CAW elimination job in Embodiment 3.

According to the CAW elimination job in the modification example described above, the copy process program 112 can reduce the process time in comparison with the CAW elimination job in Embodiment 3.

Example 4

Figure 32:
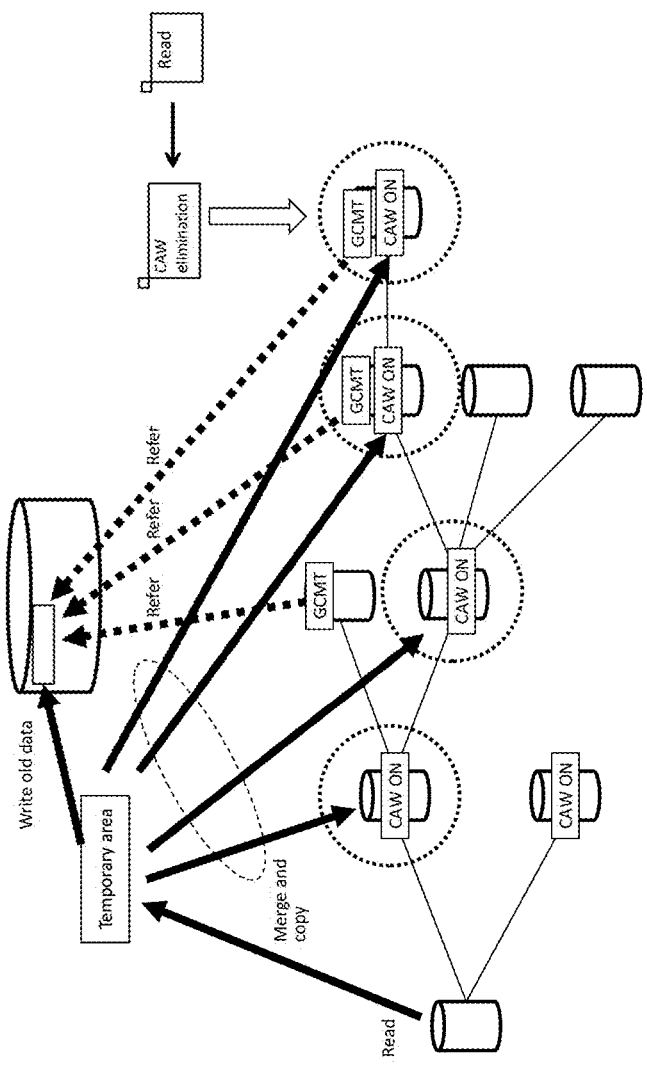
FIG. 32 shows an overview of a CAW elimination process in Embodiment 4.

FIG. 32 shows an overview of a CAW elimination process in Embodiment 4.

The old data save destination is the GCMT shared among generations. Accordingly, no update due to write for the old data save destination does occur. Consequently, the old data saving process is performed for each generation, thus copying the same data. The copy process program 112 in this Embodiment copies the save data with the same copy source only once, and records the old data save destination as the reference destination of each GCMT, thereby improving the data use efficiency of the pool.

Figure 33:
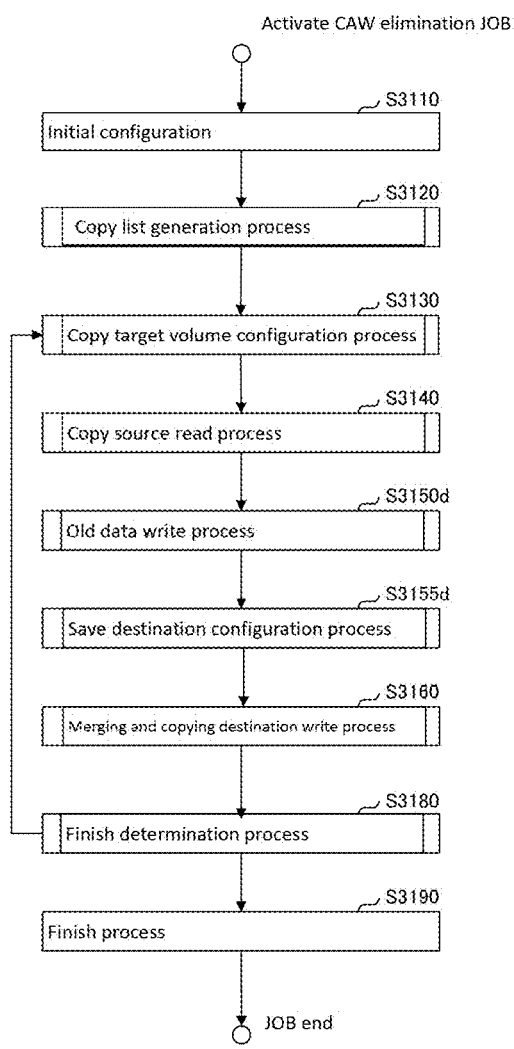
FIG. 33 shows a CAW elimination job in Embodiment 4.

FIG. 33 shows the CAW elimination job in Embodiment 4.

The first 53110 to S3140 in the CAW elimination job in Embodiment 4 are analogous to those of the CAW elimination job in Embodiment 3.

Subsequently, S3150*d*, the copy process program 112 preforms the old data write process that writes common save data into the pool only once. Subsequently, in 53155*d*, the copy process program 112 performs the save destination configuration process that records, into the GCMT, the pointer that indicates the pool slot serving as the save destination of the save data.

Subsequent S3160 to S3190 are analogous to those of the CAW elimination job in Embodiment 3.

According to the CAW elimination job described above, duplication of the save data in the pool is eliminated, thereby allowing the amount of use of the pool to be reduced.

The details of the aforementioned old data write process in S3150*d* are described.

Figure 34:
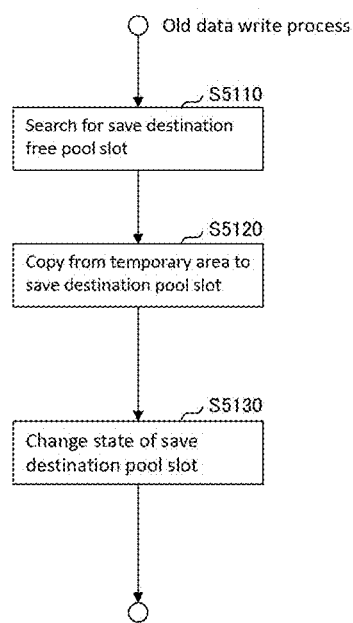
FIG. 34 shows an old data write process in Embodiment 4.

FIG. 34 shows the old data write process in Embodiment 4.

In 55110, the copy process program 112 searches for the free pool slot, and secures the obtained free pool slot as the save destination pool slot. Subsequently, in 55120, the copy process program 112 performs copying from the temporary area to the save destination pool slot. Subsequently, in 55130, the copy process program 112 changes the state 364 of the save destination pool slot in the pool slot information 360 from "Unallocated" to "Allocated", and finishes this flow.

According to the old data write process described above, the copy process program 112 can copy the copy source data to the pool.

The details of the aforementioned save destination configuration process in 53155*d* are described.

Figure 35:
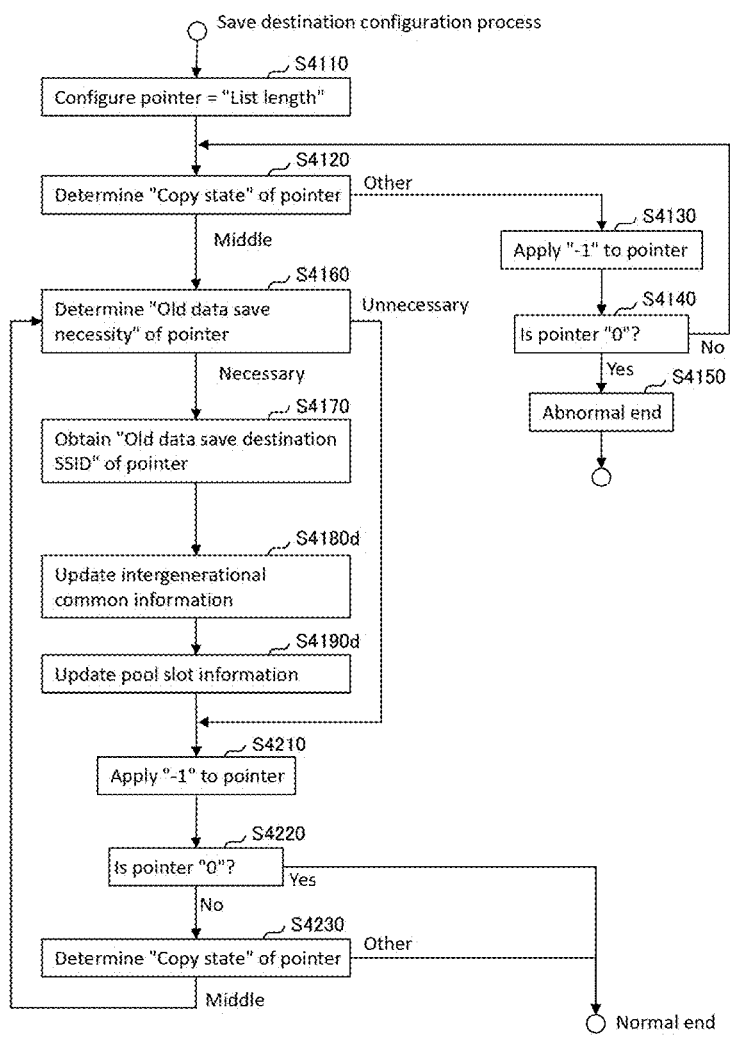
FIG. 35 shows a save destination configuration process in Embodiment 4.

FIG. 35 shows the save destination configuration process in Embodiment 4.

The first 54110 to S4170 in the save destination configuration process in Embodiment 4 are analogous to those in the old data save destination write process in Embodiment 3.

Subsequently, in S4180*d*, the copy process program 112 records the save destination pool slot into the pool information on the target slot with respect to the GCMT of the element indicated by the pointer, and changes the state of the target slot to "Allocated". Subsequently, in 54190*d*, the copy process program 112 records the information indicating the target slot in the GCMT of the element indicated by the pointer, into the reference source information of the save destination pool slot in the pool slot information 360.

Subsequent S4210 to S4230 are analogous to those in the old data save destination write process in Embodiment 3.

According to the save destination configuration process described above, the copy process program 112 can allocate the save data written in the pool, to the multiple volumes.

Terms for representing the present invention are described. A finalization process corresponds to the CAW elimination process and the like. A save process corresponds to the old data save process, the old data save destination write process, the old data write process, the save destination configuration process and the like. A merge process corresponds to the merging and copying process, the merging and copying destination write process and the like. Finalization of data corresponds to a state that is not the CAW state, a state of the CAW flag of being OFF and the like. Unfinalization of data corresponds to a state that is the CAW state, a state of the CAW flag of being ON and the like. Unfinalized volume corresponds to the volume or the like where the target slot is in the CAW state.

The embodiments have thus been described above. These are the examples for describing the present invention. There is no intention to limit the scope of the present invention only to the configurations described above. The present invention can be executed in other various embodiments.

REFERENCE SIGNS LIST

10 . . . Storage apparatus, 20 . . . Host computer, 30 . . . Management terminal, 100 . . . Controller, 110 . . . Memory, 120 . . . CPU, 130 . . . Bridge, 140 . . . Upper level interface, 150 . . . Lower level interface, 160 . . . Communication interface, 200 . . . Storage device, 210 . . . Disk

The invention claimed is:

1. A storage apparatus, comprising:
a storage device;
a memory; and
a processor coupled to the storage device, the memory, and a host computer,
wherein the processor is configured to generate a pool for using the storage device,
the processor is configured to generate a plurality of volumes, each volume includes a plurality of slots, the plurality of volumes include a root volume and a plurality of secondary virtual volumes, and each secondary virtual volume is configured to store a snapshot of a parent volume among the plurality of volumes at a designated time point, the processor is configured to associate the plurality of slots in each virtual volume with a plurality of slots in a corresponding parent volume, the processor is configured to associate a slot for storing data from the plurality of slots in each virtual volume with a pool area in the pool, the processor is configured to write, into the pool, difference data between the parent volume with a corresponding one of the secondary virtual volumes, the processor is configured to record, into the memory, management information that indicates a relationship between the plurality of volumes and the pool, the processor is configured to, in a case where the processor receives, from the host computer, write data to be written into a target slot in a target volume among the plurality of volumes, record, to the management information, a fact that data in the target slot in the target volume has not been finalized, write the write data into a target cache area in the memory, and transmit a response to the host computer, before referring to the target data in the target slot of the target volume, the processor is configured to determine whether or not the target data has been finalized on the basis of the management information, in a case where the target data is determined as not having been finalized, the processor is configured to perform a finalization process for finalizing the target data before referring to the target data, the finalization process is configured to select a copy source volume for storing data in the target slot in the target volume based on the management information, and determine whether a copy source volume data in a target slot in the copy source volume is finalized or not based on the management information, in a case where the copy source volume data is determined to be finalized, the finalization process is configured to perform a save process for saving the target data, perform a merge process for updating the target data, and record finalization of the target data into the management information, the saving process is configured to determine whether the target data is required to be saved or not based on the management information, when it is determined that the target data is required to be saved, the saving process is configured to write the target data into the pool, and the merge process is configured to generate merged data by merging the copy source data with the write data, and write the merged data into the pool.

2. The storage apparatus according to claim 1, wherein in the case where the copy source data is determined not to be finalized, the finalization process is configured to perform a finalization process for finalizing the copy source data.

3. The storage apparatus according to claim 2, wherein in the case where the copy source volume data is determined to be finalized, the finalization process is further configured to select a save destination volume for storing a snapshot of the target volume based on the management information, and determine whether the target data is required to be saved or not based on the management information, and in the case where it is determined that the target data is required to be saved, the finalization process is configured to associate a save destination pool area in the pool with a target slot in the save destination volume, write the copy source data into the save destination pool area, associate an update destination pool area in the pool with the target slot in the target volume, and write the merged data into the update destination pool area.

4. The storage apparatus according to claim 3, wherein the finalization process is further configured to identify a maintenance address range that is other than an address range to be updated with the write data in the target cache area, and generate the merged data by writing data in the maintenance address range in the copy source data into the maintenance address range in the target cache area.

5. The storage apparatus according to claim 4, wherein in a case of referring to the target data, the processor is configured to activate a first job of performing the finalization process for the target data, in the case where the copy source data is determined not to be finalized, the first job activates a second job of a finalization process for the copy source data, and stands by, and in a case where the second job is finished, the first job is reactivated.

6. The storage apparatus according to claim 4, wherein the finalization process is further configured to repeat a process of selecting, as an unfinalized volume, a latest-generation volume among volumes which are of a generation of the target volume or thereafter and in which data in the target slot is not finalized, based on the management information, the saving process for the unfinalized volume, and the merge process for the unfinalized volume, until no unfinalized volumes are remaining.

7. The storage apparatus according to claim 4, wherein the finalization process is further configured to select, as an unfinalized volume, a volume which is of a generation of the target volume and thereafter and in which data in the target slot is not finalized, sequentially from a latest-generation volume, based on the management information, select the copy source volume for the unfinalized volume, at least one save destination volume for the unfinalized volume, and at least one update destination volume for the unfinalized volume, and read the data in the target slot in the copy source volume, into a temporary area in the memory, the saving process is configured to write the data in the temporary area into the save destination pool area associated with the target slot in the at least one save destination volume, and the merge process is configured to generate the merged data by merging the data in the temporary area with the write data, and write the merged data into an update destination data area associated with the target slot in the at least one update destination volume.

8. The storage apparatus according to claim 7, wherein the finalization process is configured to activate a job for the save process for each of the at least one save destination volume, and the finalization process is configured to activate a job for the merge process for each of the at least one update destination volume.

9. The storage apparatus according to claim 4, wherein the finalization process is configured to select, as the unfinalized volume, a volume which is of a generation of the target volume and thereafter and in which data in the target slot is not finalized, sequentially from a latest-generation volume, based on the management information, select the copy source volume for the unfinalized volume, at least one save destination volume for the unfinalized volume, and at least one update destination volume for the unfinalized volume, and read the data in the target slot in the copy source volume, into a temporary area in the memory, the saving process is configured to secure the save destination pool area from the pool, write the data in the temporary area into the save destination pool area, and associate the save destination pool area with the target slot in each of the at least one save destination volume, and the merge process is configured to generate the merged data by merging the data in the temporary area with the write data, write the merged data into an update destination data area associated with the target slot in the at least one update destination volume.

10. The storage apparatus according to claim 3, wherein the processor is configured to record, into the management information, a time point of writing the write data, and an identification number that indicates an order with respect to a generation of the snapshot, and the finalization process is configured to select, as the save destination volume, the volume of the snapshot immediately before the time point of the write data, by comparing the identification number of writing of the write data with the identification number of the snapshot that stores the snapshot of the target volume.

11. The storage apparatus according to claim 1, wherein in the case where the write data is received in a state where the copy source data and the target data are not updated after the snapshot of the target volume is generated, the saving process is configured to determine that the target data is required to be saved.

12. The storage apparatus according to claim 1, wherein in a case where an instruction for generating the snapshot is received, the processor is configured to cause a display device to display information indicating whether the parent volume of the snapshot is to be stored in a snapshot of another volume, based on the management information.

13. The storage apparatus according to claim 1, wherein the processor is configured to cause a display device to display information that indicates a relationship between snapshots of the plurality of volumes, based on the management information.

14. A non-transitory computer-readable recording medium storing a program causing a processor coupled to a storage device, a memory and a host computer to execute a process, the process is configured to:

generate a pool for using the storage device, generate a plurality of volumes, each volume includes a plurality of slots, the plurality of volumes include a root volume and a plurality of secondary virtual volumes, and each secondary virtual volume is configured to store a snapshot of a parent volume among the plurality of volumes at a designated time point, associate the plurality of slots in each virtual volume with a plurality of slots in the corresponding parent volume, associate a slot for storing data from the plurality of slots in each virtual volume with a pool area in the pool, write, into the pool, difference data between the parent volume with a corresponding one of the secondary virtual volumes, record, into the memory, management information that indicates a relationship between the plurality of volumes and the pool, in a case of receiving, from the host computer, write data to be written into a target slot in a target volume among the plurality of volumes, record, to the management information, a fact that data in the target slot in the target volume has not been finalized, write the write data into a target cache area in the memory, and transmit a response to the host computer, before referring to the target data in the target slot of the target volume, determine whether or not the target data has been finalized on the basis of the management information, and in a case where the target data is determined as not having been finalized, perform a finalization process for finalizing the target data before referring to the target data, and wherein the finalization process is configured to select a copy source volume for storing data in the target slot in the target volume based on the management information, and determine whether a copy source volume data in a target slot in the copy source volume is finalized or not based on the management information, in a case where the copy source volume data is determined to be finalized, the finalization process is configured to perform a save process for saving the target data, perform a merge process for updating the target data, and record finalization of data into the management information, the saving process is configured to determine whether the target data is required to be saved or not based on the management information, in a case where it is determined that the target data is required to be saved, the saving process is configured to write the target data into the pool, and the merge process is configured to generate merged data by merging the copy source data with the write data, and write the merged data into the pool.

* * * * *